(12) United States Patent
Takamatsu

(10) Patent No.: US 6,884,079 B2
(45) Date of Patent: Apr. 26, 2005

(54) MOLECULAR MODEL REPRESENTING MOLECULAR STRUCTURE

(75) Inventor: Tadahisa Takamatsu, Fukushima (JP)

(73) Assignee: Talou Co., Ltd., Fukushima (JP)

( * ) Notice: Subject to any disclaimer, the term of this patent is extended or adjusted under 35 U.S.C. 154(b) by 0 days.

(21) Appl. No.: 10/890,575

(22) Filed: Jul. 14, 2004

(65) Prior Publication Data

US 2005/0058975 A1 Mar. 17, 2005

Related U.S. Application Data

(63) Continuation-in-part of application No. 10/230,779, filed on Aug. 29, 2002, now abandoned.

(30) Foreign Application Priority Data

Feb. 8, 2002 (JP) ........................................ 2002-031680

(51) Int. Cl.[7] .............................................. G09B 23/26
(52) U.S. Cl. ...................................................... 434/278
(58) Field of Search ................................ 434/276, 277, 434/278, 279, 280, 281, 283

(56) References Cited

U.S. PATENT DOCUMENTS

| | | | | |
|---|---|---|---|---|
| 2,942,357 A | * | 6/1960 | Adler et al. ................. | 434/278 |
| 3,510,962 A | * | 5/1970 | Sato ............................ | 434/278 |
| 3,841,001 A | | 10/1974 | Nicholson | |
| 3,939,581 A | * | 2/1976 | Clarke, Jr. ................... | 434/278 |
| 4,099,339 A | | 7/1978 | Snelson | |
| 4,184,271 A | | 1/1980 | Barnett, Jr. | |
| 4,325,698 A | | 4/1982 | Darling et al. | |
| 4,378,218 A | * | 3/1983 | Fletterick et al. ........... | 434/279 |
| 4,416,635 A | | 11/1983 | Smith | |
| 4,877,406 A | * | 10/1989 | Wilk .......................... | 434/278 |
| 4,906,122 A | * | 3/1990 | Barrett et al. ............... | 403/305 |
| 5,030,103 A | | 7/1991 | Buist et al. | |
| 6,125,235 A | | 9/2000 | Padilla et al. | |

FOREIGN PATENT DOCUMENTS

| | | |
|---|---|---|
| JP | 2-282286 | 11/1990 |
| JP | 3-242680 | 10/1991 |
| JP | 4-214587 | 8/1992 |
| JP | 8-022244 | 1/1996 |
| JP | 8-202260 | 8/1996 |
| JP | 2000-321972 | 11/2000 |
| JP | 2001-092349 | 4/2001 |
| JP | 2002-175007 | 6/2002 |

* cited by examiner

Primary Examiner—Kurt Fernstrom
(74) Attorney, Agent, or Firm—Muramatsu & Associates

(57) ABSTRACT

A molecular model for chemistry that shows a molecular structure by expressing the distance between the atoms obtained by molecular structure analysis as the total length from two atoms and one bond as well as accurately visualizing the molecular structure without using numeric values of the van der Waals radius or covalent bond radius. The molecular model is provided with a spherical body representing the atom and a bonding rod representing an interatomic bond. The molecular model is to establish a general solution with versatility by (a) differentiating the radiuses of the spherical atoms in the valence state rather than an element unit, and applying different radial lengths even within the same element, and (b) applying the bonding rod differentiated by the bonding state between the atoms.

6 Claims, 25 Drawing Sheets

| Symbol | | Formal Notation |
|---|---|---|
| ≧R< | ⇒ | =R< |
| ≫R= | ⇒ | ≧R= |
| >R∈ | ⇒ | >R< |
| >B->C= | ⇒ | >B-C= |
| =C<>C< | ⇒ | =C-C- |
| F-∋S∈ | ⇒ | F>S< |
| -N≪=O | ⇒ | -N=O |
| O=≧S< | ⇒ | O=S< |

Fig.3

| Bond Type | Symbol | Size (Å) | Sample (n) | Bond Type | Symbol | Size (Å) | Sample (n) |
|---|---|---|---|---|---|---|---|
| Single Bond | — | 0.700 | | s15 | ≫S< | 0.614 | 14 |
| 1.5 Bond | ≂ | 0.640 | | s16 | ≧S< | 0.603 | 2 |
| Double Bond | = | 0.585 | | s17 | ∋S∈ | 0.616 | 1 |
| 2.5 Bond | ≅ | 0.550 | | cl10 | Cl— | 0.657 | 50 |
| Triple Bond | ≡ | 0.520 | | cl11 | —Cl— | 0.675 | 3 |
| h10 | H— | 0.000 | 286 | as10 | As— | 0.823 | 1 |
| b10 | B— | 0.413 | 4 | as11 | >As— | 0.823 | 6 |
| b11 | =B— | 0.379 | 10 | as12 | =As∈ | 0.800 | 1 |
| b12 | >B— | 0.405 | 17 | se10 | Se— | 0.781 | 2 |
| b13 | >B< | 0.506 | 8 | se11 | —Se— | 0.825 | 4 |
| c10 | C— | 0.344 | 3 | se12 | =Se< | 0.763 | 2 |
| c11 | ≡C— | 0.335 | 40 | se13 | ∋Se∈ | 0.740 | 1 |
| c12 | >C— | 0.380 | 182 | br10 | Br— | 0.803 | 20 |
| c13 | >C< | 0.415 | 147 | br11 | —Br— | 0.802 | 3 |
| c14 | =C— | 0.345 | 1 | br12 | >Br∈ | 0.808 | 1 |
| n10 | N— | 0.321 | 3 | te11 | >Te< | 0.870 | 1 |
| n11 | —N— | 0.366 | 2 | i10 | I— | 0.977 | 17 |
| n12 | =N— | 0.344 | 54 | i11 | >I∈ | 0.915 | 1 |
| n13 | >N— | 0.339 | 48 | b20 | B= | 0.373 | 3 |
| n14 | —N< | 0.338 | 45 | b22 | =B= | 0.440 | 1 |
| n15 | —N≪ | 0.386 | 15 | c20 | C= | 0.340 | 4 |
| n16 | >N< | 0.370 | 17 | c22 | =C= | 0.347 | 7 |
| n17 | ≡N— | 0.305 | 2 | n20 | N= | 0.326 | 2 |
| o10 | O— | 0.260 | 5 | n22 | =N= | 0.370 | 1 |
| o11 | —O— | 0.288 | 86 | n23 | ≡N= | 0.342 | 5 |
| f10 | F— | 0.245 | 42 | o20 | O= | 0.250 | 161 |
| si10 | Si— | 0.750 | 3 | si20 | Si= | 0.678 | 3 |
| si11 | —Si— | 0.645 | 1 | p20 | P= | 0.647 | 3 |
| si12 | >Si— | 0.781 | 1 | p21 | =P= | 0.642 | 1 |
| si13 | >Si< | 0.733 | 33 | s20 | S= | 0.655 | 10 |
| p10 | P— | 0.649 | 3 | s23 | =S= | 0.627 | 4 |
| p11 | —P— | 0.683 | 2 | s26 | ≫S= | 0.595 | 1 |
| p12 | >P— | 0.715 | 13 | se20 | Se= | 0.744 | 5 |
| p13 | =P— | 0.627 | 16 | se21 | =Se= | 0.773 | 1 |
| p14 | >P∈ | 0.661 | 4 | se22 | ≫Se= | 0.853 | 1 |
| s10 | S— | 0.659 | 2 | te20 | Te= | 0.979 | 2 |
| s11 | —S— | 0.674 | 36 | c30 | C≡ | 0.345 | 1 |
| s12 | =S— | 0.661 | 6 | n30 | N≡ | 0.302 | 19 |
| s13 | ≡S— | 0.678 | 1 | o30 | O≡ | 0.263 | 1 |
| s14 | >S= | 0.652 | 8 | p30 | P≡ | 0.669 | 1 |

Fig.4

| | Bond Type | Symbol | Single Bond Rod Length (Å) | | | | | |
|---|---|---|---|---|---|---|---|---|
| | | | -0.1 | 0.1 | 0.3 | 0.5 | 0.7 | 0.9 |
| Size (Å) | Double Bond | = | -0.215 | -0.015 | 0.185 | 0.385 | 0.585 | 0.785 |
| | Triple Bond | ≡ | -0.280 | -0.080 | 0.120 | 0.320 | 0.520 | 0.720 |
| | h10 | H— | 0.396 | 0.296 | 0.196 | 0.096 | -0.004 | -0.104 |
| | c12 | >C— | 0.780 | 0.680 | 0.580 | 0.480 | 0.380 | 0.280 |
| | f10 | F— | 0.645 | 0.545 | 0.445 | 0.345 | 0.245 | 0.145 |
| | s11 | —S— | 1.074 | 0.974 | 0.874 | 0.774 | 0.674 | 0.574 |
| | i10 | I— | 1.377 | 1.277 | 1.177 | 1.077 | 0.977 | 0.877 |

Fig. 6

| Serial 1-# | Atom Type | | Valence Symbol | | Bond Distance | | New Model |
|---|---|---|---|---|---|---|---|
| | | | | | Mean (Å) | Sample (n) | Measured (Å) |
| 1 | h10 | h10 | H— | —H | 0.741 | 1 | 0.700 |
| 2 | h10 | b10 | H— | —B | 1.232 | 1 | 1.113 |
| 3 | h10 | b11 | H— | —B= | 1.169 | 2 | 1.079 |
| 4 | h10 | b12 | H— | —B< | 1.220 | 3 | 1.105 |
| 5 | h10 | b13 | H— | >B< | 1.214 | 4 | 1.206 |
| 6 | h10 | c10 | H— | —C | 1.118 | 1 | 1.044 |
| 7 | h10 | c11 | H— | —C≡ | 1.065 | 10 | 1.035 |
| 8 | h10 | c12 | H— | >C= | 1.084 | 57 | 1.080 |
| 9 | h10 | c13 | H— | >C< | 1.100 | 127 | 1.115 |
| 10 | h10 | n10 | H— | —N | 1.038 | 1 | 1.021 |
| 11 | h10 | n11 | H— | —N— | 1.025 | 1 | 1.066 |
| 12 | h10 | n12 | H— | —N= | 1.018 | 5 | 1.044 |
| 13 | h10 | n13 | H— | —N< | 1.014 | 14 | 1.039 |
| 14 | h10 | n14 | H— | >N— | 1.017 | 3 | 1.038 |
| 15 | h10 | n16 | H— | >N< | 1.040 | 3 | 1.070 |
| 16 | h10 | o10 | H— | —O | 0.970 | 1 | 0.960 |
| 17 | h10 | o11 | H— | —O— | 0.975 | 21 | 0.988 |
| 18 | h10 | f10 | H— | —F | 0.917 | 1 | 0.945 |
| 19 | h10 | si10 | H— | —Si | 1.520 | 1 | 1.450 |
| 20 | h10 | si12 | H— | —Si< | 1.468 | 1 | 1.481 |
| 21 | h10 | si13 | H— | >Si< | 1.480 | 11 | 1.433 |
| 22 | h10 | p10 | H— | —P | 1.421 | 1 | 1.349 |
| 23 | h10 | p11 | H— | —P— | 1.418 | 1 | 1.383 |
| 24 | h10 | p12 | H— | —P< | 1.422 | 3 | 1.415 |
| 25 | h10 | s10 | H— | —S | 1.340 | 1 | 1.359 |
| 26 | h10 | s11 | H— | —S— | 1.336 | 4 | 1.374 |
| 27 | h10 | s12 | H— | —S= | 1.389 | 1 | 1.361 |
| 28 | h10 | cl10 | H— | —Cl | 1.275 | 1 | 1.357 |
| 29 | h10 | as10 | H— | —As | 1.523 | 1 | 1.523 |
| 30 | h10 | as11 | H— | —As< | 1.513 | 1 | 1.523 |
| 31 | h10 | se10 | H— | —Se | 1.464 | 1 | 1.481 |
| 32 | h10 | br10 | H— | —Br | 1.415 | 1 | 1.503 |
| 33 | h10 | i10 | H— | —I | 1.609 | 1 | 1.677 |
| 34 | b10 | b10 | B— | —B | 1.589 | 1 | 1.526 |
| 35 | b10 | f10 | B— | —F | 1.263 | 1 | 1.358 |
| 36 | b10 | cl10 | B— | —Cl | 1.715 | 1 | 1.770 |
| 37 | b11 | f10 | =B— | —F | 1.283 | 1 | 1.324 |
| 38 | b11 | cl10 | =B— | —Cl | 1.682 | 2 | 1.736 |
| 39 | b12 | c12 | >B— | >C= | 1.530 | 1 | 1.485 |
| 40 | b12 | c13 | >B— | >C< | 1.578 | 1 | 1.520 |
| 41 | b12 | n13 | >B— | —N< | 1.435 | 1 | 1.444 |
| 42 | b12 | o11 | >B— | —O— | 1.358 | 6 | 1.393 |
| 43 | b12 | f10 | >B— | —F | 1.316 | 3 | 1.350 |
| 44 | b12 | cl10 | >B— | —Cl | 1.740 | 1 | 1.762 |
| 45 | b12 | br10 | >B— | —Br | 1.893 | 1 | 1.908 |

Fig. 7

| Serial 1-# | Atom Type | | Valence Symbol | | Bond Distance | | New Model Measured (Å) |
|---|---|---|---|---|---|---|---|
| | | | | | Mean (Å) | Sample (n) | |
| 46 | b12 | i10 | >B− | −I | 2.118 | 1 | 2.082 |
| 47 | b13 | b13 | >B< | >B< | 1.740 | 2 | 1.712 |
| 48 | b13 | c13 | >B< | >C< | 1.530 | 1 | 1.621 |
| 49 | b13 | o11 | >B< | −O− | 1.540 | 1 | 1.494 |
| 50 | c10 | f10 | C− | −F | 1.272 | 1 | 1.289 |
| 51 | c10 | cl10 | C− | −Cl | 1.645 | 1 | 1.701 |
| 52 | c11 | c11 | ≡C− | −C≡ | 1.377 | 6 | 1.370 |
| 53 | c11 | c12 | ≡C− | >C= | 1.451 | 8 | 1.415 |
| 54 | c11 | c13 | ≡C− | >C< | 1.459 | 8 | 1.450 |
| 55 | c11 | n13 | ≡C− | −N< | 1.354 | 4 | 1.374 |
| 56 | c11 | s11 | ≡C− | −S− | 1.684 | 1 | 1.709 |
| 57 | c11 | cl10 | ≡C− | −Cl | 1.631 | 5 | 1.692 |
| 58 | c11 | br10 | ≡C− | −Br | 1.789 | 3 | 1.838 |
| 59 | c11 | i10 | ≡C− | −I | 1.983 | 3 | 2.012 |
| 60 | c12 | c12 | =C< | >C= | 1.455 | 47 | 1.460 |
| 61 | c12 | c13 | =C< | >C< | 1.512 | 59 | 1.495 |
| 62 | c12 | n12 | =C< | −N= | 1.361 | 23 | 1.424 |
| 63 | c12 | n13 | =C< | −N< | 1.383 | 7 | 1.419 |
| 64 | c12 | n14 | =C< | >N− | 1.362 | 33 | 1.418 |
| 65 | c12 | n15 | =C< | −N« | 1.462 | 6 | 1.466 |
| 66 | c12 | n16 | =C< | >N< | 1.470 | 1 | 1.450 |
| 67 | c12 | o11 | =C< | −O− | 1.342 | 28 | 1.368 |
| 68 | c12 | f10 | =C< | −F | 1.327 | 3 | 1.325 |
| 69 | c12 | s11 | =C< | −S− | 1.747 | 7 | 1.754 |
| 70 | c12 | s15 | =C< | >S« | 1.778 | 1 | 1.694 |
| 71 | c12 | cl10 | =C< | −Cl | 1.733 | 11 | 1.737 |
| 72 | c12 | br10 | =C< | −Br | 1.887 | 2 | 1.883 |
| 73 | c12 | i10 | =C< | −I | 2.114 | 1 | 2.057 |
| 74 | c13 | c13 | >C< | >C< | 1.527 | 147 | 1.530 |
| 75 | c13 | n12 | >C< | −N= | 1.482 | 3 | 1.459 |
| 76 | c13 | n13 | >C< | −N< | 1.466 | 14 | 1.454 |
| 77 | c13 | n14 | >C< | >N− | 1.462 | 8 | 1.453 |
| 78 | c13 | n15 | >C< | −N« | 1.489 | 1 | 1.501 |
| 79 | c13 | n16 | >C< | >N< | 1.491 | 13 | 1.485 |
| 80 | c13 | n17 | >C< | −N≡ | 1.424 | 1 | 1.420 |
| 81 | c13 | o11 | >C< | −O− | 1.425 | 31 | 1.403 |
| 82 | c13 | f10 | >C< | −F | 1.335 | 15 | 1.360 |
| 83 | c13 | si13 | >C< | >Si< | 1.871 | 4 | 1.848 |
| 84 | c13 | p12 | >C< | −P< | 1.855 | 3 | 1.830 |
| 85 | c13 | s11 | >C< | −S− | 1.820 | 12 | 1.789 |
| 86 | c13 | s14 | >C< | >S= | 1.793 | 2 | 1.767 |
| 87 | c13 | s15 | >C< | >S« | 1.771 | 1 | 1.729 |
| 88 | c13 | cl10 | >C< | −Cl | 1.780 | 19 | 1.772 |
| 89 | c13 | as11 | >C< | −As< | 1.968 | 1 | 1.938 |
| 90 | c13 | se11 | >C< | −Se− | 1.948 | 2 | 1.940 |

Fig. 8

| Serial 1-# | Atom Type | | Valence Symbol | | Bond Distance | | New Model |
|---|---|---|---|---|---|---|---|
| | | | | | Mean (Å) | Sample (n) | Measured (Å) |
| 91 | c13 | br10 | >C< | −Br | 1.932 | 9 | 1.918 |
| 92 | c13 | i10 | >C< | −I | 2.140 | 3 | 2.092 |
| 93 | c14 | f10 | =C− | −F | 1.330 | 1 | 1.290 |
| 94 | n10 | f10 | N− | −F | 1.317 | 1 | 1.266 |
| 95 | n10 | cl10 | N− | −Cl | 1.611 | 1 | 1.678 |
| 96 | n11 | f10 | −N− | −F | 1.353 | 1 | 1.311 |
| 97 | n12 | n12 | =N− | −N= | 1.374 | 5 | 1.388 |
| 98 | n12 | n13 | =N− | −N< | 1.344 | 1 | 1.383 |
| 99 | n12 | n15 | =N− | −N≪ | 1.864 | 1 | 1.430 |
| 100 | n12 | o11 | =N− | −O− | 1.381 | 6 | 1.332 |
| 101 | n12 | f10 | =N− | −F | 1.517 | 1 | 1.289 |
| 102 | n12 | s11 | =N− | −S− | 1.625 | 2 | 1.708 |
| 103 | n12 | cl10 | =N− | −Cl | 1.975 | 1 | 1.701 |
| 104 | n13 | n13 | >N− | −N< | 1.447 | 1 | 1.378 |
| 105 | n13 | n15 | >N− | −N≪ | 1.427 | 1 | 1.425 |
| 106 | n13 | o11 | >N− | −O− | 1.453 | 1 | 1.327 |
| 107 | n13 | f10 | >N− | −F | 1.399 | 3 | 1.284 |
| 108 | n13 | cl10 | >N− | −Cl | 1.759 | 1 | 1.696 |
| 109 | n14 | n14 | −N< | >N− | 1.382 | 1 | 1.376 |
| 110 | n15 | n15 | ≫N− | −N≪ | 1.782 | 1 | 1.472 |
| 111 | n15 | o11 | ≫N− | −O− | 1.404 | 2 | 1.374 |
| 112 | n15 | f10 | ≫N− | −F | 1.467 | 1 | 1.331 |
| 113 | n15 | cl10 | ≫N− | −Cl | 1.843 | 1 | 1.743 |
| 114 | o10 | f10 | O− | −F | 1.358 | 1 | 1.205 |
| 115 | o10 | cl10 | O− | −Cl | 1.570 | 1 | 1.617 |
| 116 | o10 | br10 | O− | −Br | 1.717 | 1 | 1.763 |
| 117 | o10 | i10 | O− | −I | 1.868 | 1 | 1.937 |
| 118 | o11 | o11 | −O− | −O− | 1.448 | 2 | 1.276 |
| 119 | o11 | f10 | −O− | −F | 1.405 | 1 | 1.233 |
| 120 | o11 | si13 | −O− | >Si< | 1.752 | 2 | 1.721 |
| 121 | o11 | p12 | −O− | −P< | 1.638 | 1 | 1.703 |
| 122 | o11 | p13 | −O− | −P= | 1.590 | 6 | 1.615 |
| 123 | o11 | s15 | −O− | >S≪ | 1.597 | 2 | 1.602 |
| 124 | o11 | cl10 | −O− | −Cl | 1.686 | 3 | 1.645 |
| 125 | f10 | f10 | F− | −F | 1.412 | 1 | 1.190 |
| 126 | f10 | si10 | F− | −Si | 1.601 | 1 | 1.695 |
| 127 | f10 | si11 | F− | −Si− | 1.590 | 1 | 1.590 |
| 128 | f10 | si13 | F− | >Si< | 1.566 | 5 | 1.678 |
| 129 | f10 | p10 | F− | −P | 1.589 | 1 | 1.594 |
| 130 | f10 | p11 | F− | −P− | 1.576 | 3 | 1.628 |
| 131 | f10 | p12 | F− | −P< | 1.574 | 2 | 1.660 |
| 132 | f10 | p13 | F− | −P= | 1.524 | 1 | 1.572 |
| 133 | f10 | p14 | F− | >P∈ | 1.553 | 2 | 1.606 |
| 134 | f10 | s10 | F− | −S | 1.596 | 1 | 1.604 |
| 135 | f10 | s11 | F− | −S− | 1.588 | 1 | 1.619 |

Fig. 9

| Serial 1-# | Atom Type | | Valence Symbol | | Bond Distance | | New Model |
|---|---|---|---|---|---|---|---|
| | | | | | Mean (Å) | Sample (n) | Measured (Å) |
| 136 | f10 | s12 | F— | —S= | 1.602 | 1 | 1.606 |
| 137 | f10 | s14 | F— | >S= | 1.583 | 1 | 1.597 |
| 138 | f10 | s15 | F— | >S« | 1.530 | 1 | 1.559 |
| 139 | f10 | s16 | F— | >S≦ | 1.567 | 1 | 1.548 |
| 140 | f10 | s17 | F— | ∋S∈ | 1.561 | 1 | 1.561 |
| 141 | f10 | cl10 | F— | —Cl | 1.628 | 1 | 1.602 |
| 142 | f10 | cl11 | F— | —Cl< | 1.620 | 1 | 1.620 |
| 143 | f10 | as11 | F— | —As< | 1.710 | 1 | 1.768 |
| 144 | f10 | se10 | F— | —Se | 1.742 | 1 | 1.726 |
| 145 | f10 | se12 | F— | >Se— | 1.730 | 1 | 1.708 |
| 146 | f10 | se13 | F— | >Se< | 1.685 | 1 | 1.685 |
| 147 | f10 | br10 | F— | —Br | 1.759 | 1 | 1.748 |
| 148 | f10 | br11 | F— | —Br< | 1.757 | 1 | 1.747 |
| 149 | f10 | br12 | F— | >Br∈ | 1.753 | 1 | 1.753 |
| 150 | f10 | te11 | F— | >Te< | 1.815 | 1 | 1.815 |
| 151 | f10 | i10 | F— | —I | 1.910 | 1 | 1.922 |
| 152 | f10 | i11 | F— | >I∈ | 1.860 | 1 | 1.860 |
| 153 | si10 | si10 | Si— | —Si | 2.246 | 1 | 2.200 |
| 154 | si13 | si13 | —Si— | —Si— | 2.323 | 3 | 2.166 |
| 155 | si13 | s11 | —Si— | —S— | 2.129 | 1 | 2.107 |
| 156 | si13 | cl10 | —Si— | —Cl | 2.026 | 4 | 2.090 |
| 157 | si13 | br10 | —Si— | —Br | 2.183 | 2 | 2.236 |
| 158 | si13 | i10 | —Si— | —I | 2.437 | 1 | 2.410 |
| 159 | p10 | cl10 | P— | —Cl | 2.015 | 1 | 2.006 |
| 160 | p12 | p12 | >P— | —P< | 2.252 | 2 | 2.130 |
| 161 | p12 | cl10 | >P— | —Cl | 2.039 | 1 | 2.072 |
| 162 | p12 | br10 | >P— | —Br | 2.216 | 1 | 2.218 |
| 163 | p13 | cl10 | ≧P— | —Cl | 1.993 | 1 | 1.984 |
| 164 | p14 | cl10 | >P∈ | —Cl | 2.071 | 2 | 2.018 |
| 165 | s11 | s11 | —S— | —S— | 2.015 | 7 | 2.048 |
| 166 | s11 | cl10 | —S— | —Cl | 2.036 | 2 | 2.031 |
| 167 | s11 | br10 | —S— | —Br | 2.240 | 1 | 2.177 |
| 168 | s12 | s12 | =S— | —S= | 2.025 | 1 | 2.022 |
| 169 | s13 | cl10 | ≡S— | —Cl | 2.161 | 1 | 2.035 |
| 170 | s15 | cl10 | »S< | —Cl | 2.012 | 1 | 1.971 |
| 171 | cl10 | cl10 | Cl— | —Cl | 1.988 | 1 | 2.014 |
| 172 | cl10 | as11 | Cl— | —As< | 2.165 | 1 | 2.180 |
| 173 | cl10 | br10 | Cl— | —Br | 2.136 | 1 | 2.160 |
| 174 | cl10 | i10 | Cl— | —I | 2.321 | 1 | 2.334 |
| 175 | as11 | br10 | >As— | —Br | 2.324 | 1 | 2.326 |
| 176 | as11 | i10 | >As— | —I | 2.557 | 1 | 2.500 |
| 177 | se11 | se11 | —Se— | —Se— | 2.333 | 2 | 2.350 |
| 178 | br10 | br10 | Br— | —Br | 2.281 | 1 | 2.306 |
| 179 | br10 | i10 | Br— | —I | 2.469 | 1 | 2.480 |
| 180 | i10 | i10 | I— | —I | 2.666 | 1 | 2.654 |

Fig. 10

| Serial 2-# | Atom Type | | Valence Symbol | | Bond Distance | | New Model |
|---|---|---|---|---|---|---|---|
| | | | | | Mean (Å) | Sample (n) | Measured (Å) |
| 1 | b20 | b20 | B= | =B | 1.589 | 1 | 1.331 |
| 2 | b20 | n20 | B= | =N | 1.281 | 1 | 1.284 |
| 3 | b20 | n23 | B= | =N | 1.261 | 1 | 1.300 |
| 4 | b20 | o20 | B= | =O | 1.205 | 1 | 1.208 |
| 5 | b20 | s20 | B= | =S | 1.609 | 1 | 1.613 |
| 6 | b11 | o20 | −B= | =O | 1.204 | 3 | 1.214 |
| 7 | b11 | s20 | −B= | =S | 1.602 | 2 | 1.619 |
| 8 | b22 | o20 | =B= | =O | 1.265 | 1 | 1.265 |
| 9 | c20 | c20 | C= | =C | 1.277 | 2 | 1.265 |
| 10 | c20 | c22 | C= | =C= | 1.277 | 1 | 1.272 |
| 11 | c20 | p20 | C= | =P | 1.562 | 1 | 1.572 |
| 12 | c20 | s20 | C= | =S | 1.535 | 1 | 1.580 |
| 13 | c12 | c12 | >C= | =C< | 1.343 | 67 | 1.345 |
| 14 | c12 | c22 | >C= | =C= | 1.314 | 2 | 1.312 |
| 15 | c12 | n12 | >C= | =N− | 1.314 | 29 | 1.309 |
| 16 | c12 | o20 | >C= | =O | 1.220 | 94 | 1.215 |
| 17 | c12 | s20 | >C= | =S | 1.623 | 8 | 1.620 |
| 18 | c12 | n23 | >C= | =N≡ | 1.290 | 2 | 1.290 |
| 19 | c22 | c22 | =C= | =C= | 1.297 | 4 | 1.279 |
| 20 | c22 | n12 | =C= | =N− | 1.211 | 2 | 1.274 |
| 21 | c22 | o20 | =C= | =O | 1.161 | 7 | 1.182 |
| 22 | c22 | s20 | =C= | =S | 1.561 | 3 | 1.555 |
| 23 | c22 | se20 | =C= | =Se | 1.701 | 2 | 1.706 |
| 24 | c22 | te20 | =C= | =Te | 1.904 | 1 | 1.911 |
| 25 | c14 | o20 | −C= | =O | 1.170 | 1 | 1.195 |
| 26 | n20 | n23 | N= | =N≡ | 1.216 | 1 | 1.253 |
| 27 | n20 | o20 | N= | =O | 1.151 | 1 | 1.161 |
| 28 | n20 | si20 | N= | =Si | 1.572 | 1 | 1.589 |
| 29 | n20 | s20 | N= | =S | 1.494 | 1 | 1.566 |
| 30 | n20 | s23 | N= | =S= | 1.512 | 1 | 1.538 |

Fig. 11

| Serial 2-# | Atom Type | | Valence Symbol | | Bond Distance | | New Model |
|---|---|---|---|---|---|---|---|
| | | | | | Mean (Å) | Sample (n) | Measured (Å) |
| 31 | n12 | n12 | —N= | =N— | 1.237 | 3 | 1.273 |
| 32 | n12 | o20 | —N= | =O | 1.175 | 7 | 1.179 |
| 33 | n12 | s23 | —N= | =S= | 1.512 | 1 | 1.556 |
| 34 | n22 | o20 | =N= | =O | 1.195 | 1 | 1.195 |
| 35 | n23 | o20 | ≡N= | =O | 1.202 | 2 | 1.177 |
| 36 | n15 | o20 | —N≪ | =O | 1.202 | 15 | 1.221 |
| 37 | o20 | o20 | O= | =O | 1.208 | 1 | 1.085 |
| 38 | o20 | si20 | O= | =Si | 1.510 | 1 | 1.513 |
| 39 | o20 | p20 | O= | =P | 1.476 | 1 | 1.482 |
| 40 | o20 | p21 | O= | =P= | 1.467 | 1 | 1.477 |
| 41 | o20 | p13 | O= | =P∈ | 1.480 | 8 | 1.462 |
| 42 | o20 | s20 | O= | =S | 1.481 | 1 | 1.490 |
| 43 | o20 | s12 | O= | =S— | 1.468 | 3 | 1.496 |
| 44 | o20 | s14 | O= | =S< | 1.458 | 4 | 1.487 |
| 45 | o20 | s23 | O= | =S= | 1.446 | 3 | 1.462 |
| 46 | o20 | s15 | O= | ≫S< | 1.423 | 8 | 1.449 |
| 47 | o20 | s16 | O= | ≧S< | 1.408 | 1 | 1.438 |
| 48 | o20 | s26 | O= | =S≪ | 1.420 | 1 | 1.435 |
| 49 | o20 | se20 | O= | =Se | 1.640 | 1 | 1.609 |
| 50 | o20 | se12 | O= | =Se< | 1.576 | 1 | 1.598 |
| 51 | o20 | se21 | O= | =Se= | 1.608 | 1 | 1.608 |
| 52 | o20 | se22 | O= | =Se≪ | 1.688 | 1 | 1.688 |
| 53 | si20 | s20 | Si= | =S | 1.929 | 1 | 1.918 |
| 54 | si20 | se20 | Si= | =Se | 2.058 | 1 | 2.037 |
| 55 | p20 | p20 | P= | =P | 1.893 | 1 | 1.879 |
| 56 | s20 | s20 | S= | =S | 1.889 | 1 | 1.895 |
| 57 | s20 | s23 | S= | =S= | 1.884 | 1 | 1.867 |
| 58 | se20 | se20 | Se= | =Se | 2.166 | 1 | 2.133 |
| 59 | te20 | te20 | Te= | =Te | 2.557 | 1 | 2.543 |

Fig. 12

| Serial 3-# | Atom Type | | Valence Symbol | | Bond Distance | | New Model |
|---|---|---|---|---|---|---|---|
| | | | | | Mean (Å) | Sample (n) | Measured (Å) |
| 1 | c30 | n30 | C≡ | ≡N | 1.172 | 1 | 1.167 |
| 2 | c30 | n17 | C≡ | ≡N | 1.166 | 1 | 1.170 |
| 3 | c30 | o30 | C≡ | ≡O | 1.128 | 1 | 1.128 |
| 4 | c11 | c11 | −C≡ | ≡C− | 1.211 | 6 | 1.190 |
| 5 | c11 | n30 | −C≡ | ≡N | 1.158 | 16 | 1.157 |
| 6 | c11 | n23 | −C≡ | ≡N= | 1.168 | 1 | 1.197 |
| 7 | n30 | n30 | N≡ | ≡N | 1.098 | 1 | 1.124 |
| 8 | n30 | n23 | N≡ | ≡N= | 1.136 | 2 | 1.164 |
| 9 | n31 | p30 | N≡ | ≡P | 1.491 | 1 | 1.491 |
| 10 | n32 | s13 | N≡ | ≡S− | 1.500 | 1 | 1.500 |

Fig. 13

| Serial 1-# | Atom Type | | Valence Symbol | | Bond Distance | | s11 |
|---|---|---|---|---|---|---|---|
| | | | | | Mean Dsi(Å) | Sample (n) | Atom Radius Rsi(Å) |
| 26 | h10 | s11 | H− | −S− | 1.336 | 4 | 0.647 |
| 56 | c11 | s11 | ≡C− | −S− | 1.684 | 1 | 0.639 |
| 69 | c12 | s11 | =C< | −S− | 1.747 | 7 | 0.667 |
| 85 | c13 | s11 | >C< | −S− | 1.820 | 12 | 0.705 |
| 102 | n12 | s11 | =N− | −S− | 1.625 | 2 | 0.590 |
| 135 | f10 | s11 | F− | −S− | 1.588 | 1 | 0.657 |
| 155 | si13 | s11 | −Si− | −S− | 2.129 | 1 | 0.696 |
| 165 | s11 | s11 | −S− | −S− | 2.015 | 7 | 0.658 |
| 166 | s11 | cl10 | −S− | −Cl | 2.036 | 2 | 0.689 |
| 167 | s11 | br10 | −S− | −Br | 2.240 | 1 | 0.736 |

Fig. 14

| Serial 1-# | Atom Type | | Valence Symbol | Bond Distance | | h10 Atom Radius $R_{hi}$(Å) |
|---|---|---|---|---|---|---|
| | | | | Mean $D_{hi}$(Å) | Sample (n) | |
| 1 | h10 | h10 | H— —H | 0.741 | 1 | 0.021 |
| 2 | h10 | b10 | H— —B | 1.232 | 1 | 0.119 |
| 3 | h10 | b11 | H— —B= | 1.169 | 2 | 0.090 |
| 4 | h10 | b12 | H— —B< | 1.220 | 3 | 0.115 |
| 5 | h10 | b13 | H— >B< | 1.214 | 4 | 0.008 |
| 6 | h10 | c10 | H— —C | 1.118 | 1 | 0.074 |
| 7 | h10 | c11 | H— —C≡ | 1.065 | 10 | 0.030 |
| 8 | h10 | c12 | H— >C= | 1.084 | 57 | 0.004 |
| 9 | h10 | c13 | H— >C< | 1.100 | 127 | -0.015 |
| 10 | h10 | n10 | H— —N | 1.038 | 1 | 0.017 |
| 11 | h10 | n11 | H— —N— | 1.025 | 1 | -0.041 |
| 12 | h10 | n12 | H— —N= | 1.018 | 5 | -0.026 |
| 13 | h10 | n13 | H— —N< | 1.014 | 14 | -0.025 |
| 14 | h10 | n14 | H— >N— | 1.017 | 3 | -0.021 |
| 15 | h10 | n16 | H— >N< | 1.040 | 3 | -0.030 |
| 16 | h10 | o10 | H— —O | 0.970 | 1 | 0.010 |
| 17 | h10 | o11 | H— —O— | 0.975 | 21 | -0.013 |
| 18 | h10 | f10 | H— —F | 0.917 | 1 | -0.028 |
| 19 | h10 | si10 | H— —Si | 1.520 | 1 | 0.070 |
| 20 | h10 | si12 | H— —Si< | 1.468 | 1 | -0.013 |
| 21 | h10 | si13 | H— >Si< | 1.480 | 11 | 0.047 |
| 22 | h10 | p10 | H— —P | 1.421 | 1 | 0.072 |
| 23 | h10 | p11 | H— —P— | 1.418 | 1 | 0.035 |
| 24 | h10 | p12 | H— —P< | 1.422 | 3 | 0.007 |
| 25 | h10 | s10 | H— —S | 1.340 | 1 | -0.019 |
| 26 | h10 | s11 | H— —S— | 1.336 | 4 | -0.038 |
| 27 | h10 | s12 | H— —S= | 1.389 | 1 | 0.028 |
| 28 | h10 | cl10 | H— —Cl | 1.275 | 1 | -0.082 |
| 29 | h10 | as10 | H— —As | 1.523 | 1 | 0.000 |
| 30 | h10 | as11 | H— —As< | 1.513 | 1 | -0.010 |
| 31 | h10 | se10 | H— —Se | 1.464 | 1 | -0.017 |
| 32 | h10 | br10 | H— —Br | 1.415 | 1 | -0.088 |
| 33 | h10 | i10 | H— —I | 1.609 | 1 | -0.068 |

Fig. 15

| Bond Order n | 1 | 1.5 | 2 | 2.5 | 3 |
|---|---|---|---|---|---|
| An | 0.000 | −0.060 | −0.115 | −0.150 | −0.180 |
| Ln | 0.700 | 0.640 | 0.585 | 0.550 | 0.520 |

Fig. 16

| Single Bond Atom | Covalent Radius $R_{is}(1)$ | New Model $R_{itcb}(1)$ | Pauling $R_{ipcb}(1)$ |
|---|---|---|---|
| H | -0.004 | 0.35 | 0.30 |
| B | 0.420 | 0.77 | 0.81 |
| C | 0.389 | 0.74 | 0.77 |
| N | 0.340 | 0.69 | 0.74 |
| O | 0.287 | 0.64 | 0.74 |
| F | 0.245 | 0.60 | 0.72 |
| Si | 0.733 | 1.08 | 1.17 |
| P | 0.665 | 1.02 | 1.10 |
| S | 0.655 | 1.01 | 1.04 |
| Cl | 0.658 | 1.01 | 0.99 |
| As | 0.820 | 1.17 | 1.21 |
| Se | 0.792 | 1.14 | 1.17 |
| Br | 0.803 | 1.15 | 1.14 |
| Te | 0.870 | 1.22 | 1.37 |
| I | 0.974 | 1.32 | 1.33 |

| Double Bond Atom | Covalent Radius $R_{is}(2)$ | New Model $R_{itcb}(2)$ | Pauling $R_{ipcb}(2)$ |
|---|---|---|---|
| B | 0.390 | 0.69 | 0.71 |
| C | 0.345 | 0.64 | 0.67 |
| N | 0.342 | 0.64 | 0.62 |
| O | 0.250 | 0.55 | 0.62 |
| Si | 0.678 | 0.97 | 1.07 |
| P | 0.646 | 0.94 | 1.00 |
| S | 0.644 | 0.94 | 0.94 |
| Se | 0.785 | 1.08 | 1.07 |
| Te | 0.979 | 1.27 | 1.27 |

| Triple Bond Atom | Covalent Radius $R_{is}(3)$ | New Model $R_{itcb}(3)$ | Pauling $R_{ipcb}(3)$ |
|---|---|---|---|
| C | 0.345 | 0.61 | 0.60 |
| N | 0.302 | 0.56 | 0.55 |
| O | 0.263 | 0.52 | 0.55 |
| P | 0.669 | 0.93 | 0.93 |

Fig. 17
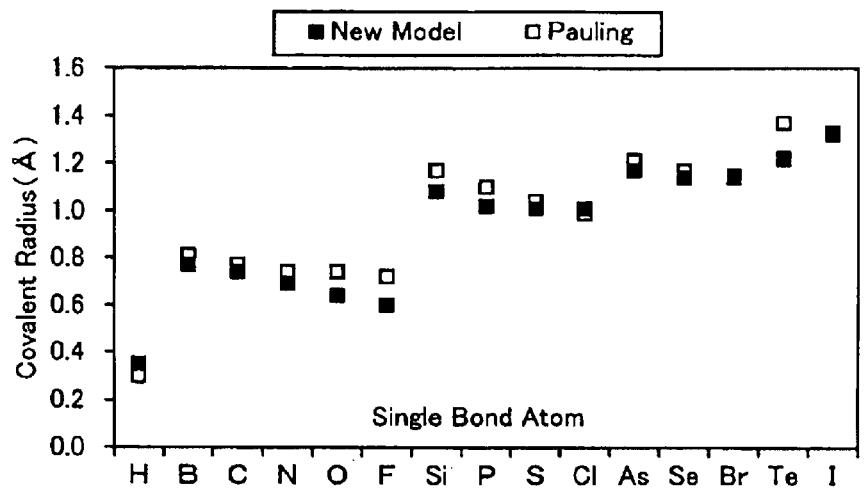
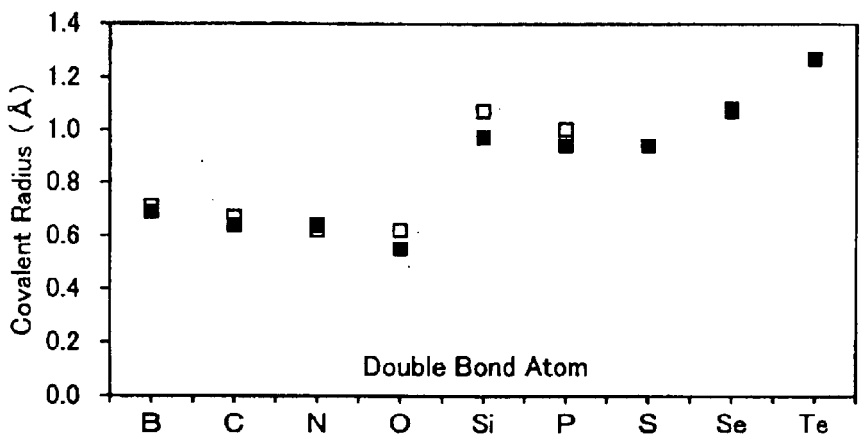
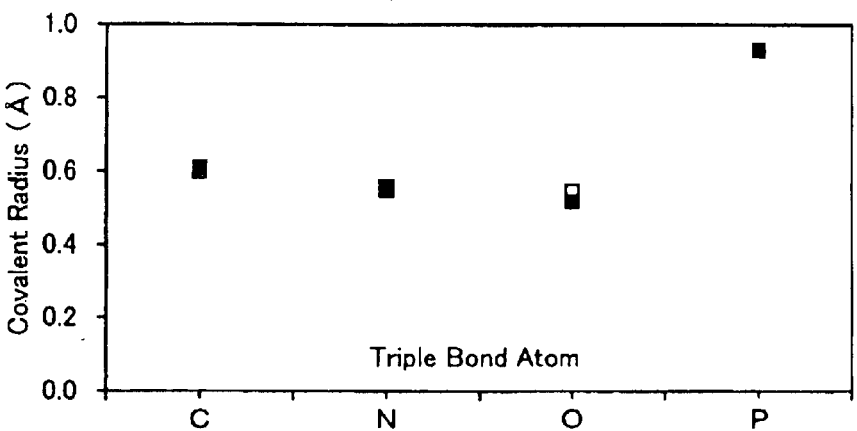

Fig. 18

| Element | New Model $R_{itvdw}$ (Å) | Pauling $R_{ipvdw}$ (Å) | Bondi $R_{ibvdw}$ (Å) |
|---|---|---|---|
| H | 1.20 | 1.20 | 1.20 |
| B | 1.62 | | |
| C | 1.59 | | 1.70 |
| N | 1.54 | 1.50 | 1.55 |
| O | 1.49 | 1.40 | 1.52 |
| F | 1.45 | 1.35 | 1.47 |
| Si | 1.93 | | 2.10 |
| P | 1.87 | 1.90 | 1.80 |
| S | 1.86 | 1.85 | 1.80 |
| Cl | 1.86 | 1.80 | 1.75 |
| As | 2.02 | 2.00 | 1.85 |
| Se | 1.99 | 2.00 | 1.90 |
| Br | 2.00 | 1.95 | 1.85 |
| Te | 2.07 | 2.20 | 2.06 |
| I | 2.17 | 2.15 | 1.98 |

Fig. 20

| Element | −Ion Radius (Å) | | +Ion Radius (Å) | |
|---|---|---|---|---|
| | −: New Model $R_{it-i}$ | −: S&P $R_{sp-i}$ | +: New Model $R_{it+i}$ | +: S&P $R_{sp+i}$ |
| H | | | −0.35 | −0.04 |
| B | | | 0.07 | 0.15 |
| C | | | 0.04 | 0.06 |
| N | 1.39 | 1.32 | −0.01 | 0.27 |
| O | 1.34 | 1.25 | | |
| F | 1.30 | 1.19 | | |
| Si | | | 0.38 | 0.40 |
| P | | | 0.32 | 0.31 |
| S | 1.71 | 1.70 | 0.31 | 0.26 |
| Cl | 1.71 | 1.67 | 0.31 | 0.22 |
| As | | | 0.47 | 0.48 |
| Se | 1.84 | 1.84 | 0.44 | 0.42 |
| Br | 1.85 | 1.82 | 0.45 | 0.39 |
| Te | 1.92 | 2.07 | 0.52 | 0.50 |
| I | 2.02 | 2.06 | 0.62 | 0.56 |

S&P : Shannon & Prewitt

Fig. 22

| a – H – b Bond Type | Distance D(aHb) (Å) | Data ※ | Atom a Radius Ras (Å) | Atom b Radius Rbs (Å) | Atom b Hydrogen Bond Measured Rbhb (Å) | Atom b Hydrogen Bond New Model Rthb (Å) |
|---|---|---|---|---|---|---|
| O–H··F | 2.72 | P | 0.288 | 0.245 | 1.732 | 1.795 |
| N–H··F | 2.92 | P | 0.339 | 0.245 | 1.881 | 1.795 |
| F–H··F | 2.44 | P | 0.245 | 0.245 | 1.495 | 1.795 |
| N–H··N | 2.98 | K | 0.339 | 0.344 | 1.941 | 1.894 |
| O–H··N | 2.79 | K | 0.288 | 0.344 | 1.802 | 1.894 |
| N–H··O | 2.89 | K | 0.339 | 0.250 | 1.851 | 1.800 |
| O–H··O | 2.72 | K | 0.288 | 0.250 | 1.732 | 1.800 |
| N–H··S | 3.42 | K | 0.339 | 0.655 | 2.381 | 2.205 |
| O–H··S | 3.31 | P | 0.288 | 0.655 | 2.322 | 2.205 |
| N–H··Br | 3.37 | P | 0.339 | 0.803 | 2.331 | 2.353 |
| O–H··Br | 3.28 | P | 0.288 | 0.803 | 2.292 | 2.353 |
| O–H··Cl | 3.12 | P | 0.288 | 0.657 | 2.132 | 2.207 |
| N–H··Cl | 3.23 | P | 0.339 | 0.657 | 2.191 | 2.207 |

※P:Pimentel  K:Kuleshova

MOLECULAR MODEL REPRESENTING MOLECULAR STRUCTURE

This application is a continuation-in-part of prior U.S. patent application Ser. No. 10/230,779 filed Aug. 29, 2002, now abandoned.

FIELD OF THE INVENTION

This invention relates to a molecular model that can accurately represent the distance between the atoms of various types of bond, and more particularly, to a molecular model that can represent the distance between the atoms obtained based on molecular structure analysis by a total length of two spherical bodies representing atoms and one bonding rod representing the inter-atomic bonds. The molecular model of the invention can accurately visualize the molecular structure without using numeric values of van der Waals radius or covalent bond radius.

BACKGROUND OF THE INVENTION

The following technologies are known for creating a molecular model which is a physical representation of a molecular structure:

(1) Hinomoto Synthetic Resin Model (Japanese Utility Model Laid-Open No. H3-86378).

The feature of the Hinomoto Synthetic Resin model (hereafter "Hinomoto model") resides in the fact that a distance between the atoms is determined by having equivalent spherical (polyhedral) atoms and changing the length of the bonding rod according to the types of bond. In this method, since there are multiple types of bond based on the types of atom, there is also a need for preparing multiple lengths of bonding rod. However, even if all such components are prepared, a user has to refer to charts every so often for assembling the components to form a molecular model, resulting in tedious labor.

A further serious problem involved in this technology resides in a theoretical aspect in which the Hinomoto model cannot accurately express a distance between any combination of atoms. For example, when considering a single bond distance between two carbon atoms C, the measured distance value when both atoms are single bonded is 1.527 Å, and the measured distance value when both atoms are triple bonded is 1.377 Å, resulting in a 10% difference. However, this model expresses the distance by using only one bonding rod. For a molecule model for a well known atomic structure can be constructed by adjusting the length of the bonding rods according to the distance between the atoms, however, such manual construction requires a great amount of labor. Further, this model cannot be applied to those molecules with unknown atomic structure. Therefore, as far as the accuracy is concerned, the application of this conventional model is limited.

(2) Bruce Heywood Nicholson Model (U.S. Pat. No. 3,841,001).

The feature of Bruce Heywood Nichoson model (hereafter "Bruce model") is that spherical atoms are designed one-third ($\frac{1}{3}$) of the van der Waals radius and are connected to the rod portion as one unit. The distance between the atoms is a sum of radiuses of the two spheres and a portion of the rod not inserted in the two spheres. The inventor of this model emphasizes that this model achieves high accuracy with use of the van der Waals radius. However, the actual distance between the atoms is based on the total length of the radiuses from the spheres and the length of the bonding rod, thus, the exclusive use of the van der Waals radius does not hold any significance. To put is more strongly, the radiuses of the spheres can be set in any way as long as the total length of those radiuses and the length of the bonding rod can be expressed accurately.

The above patent shows this problem clearly because it discloses that the differences in distance between varying atoms is determined by the depths of sockets. This means that the bonding distance between various pairs of atoms is determined by various combinations of the radial spheres and bonding rod lengths. Consequently, the Bruce model is more complicated than the Hinomoto model noted above, and is applicable to further limited pairs of atoms.

Further, another detailed yet important point is that the van der Waals radius of the carbon atoms has not been actually measured, and thus, there is no measured value. Although the covalent bond radius of the carbon is known, it cannot be incorporated as van der Waals radius since the definition is different. Either way, the Bruce model cannot accommodate the measured values from either van der Waals radius or covalent bond radius.

As mentioned above with reference to examples of conventional representing model, the reason why there has not yet been any simple and accurate configuration of molecular structure models, in spite of the progress in the chemistry, is due to the following problems:

(1) First, there is a problem because of making all the spherical atoms identical size without considering their differences in the valence state. In the Hinomoto model, all of the atoms are made identical size to one another so that the accuracy is determined only by the difference in the bonding rod lengths. However, ignoring the valence state even in the bonding distance between a pair of same atoms will result in wide unevenness of the distance and confusion as to which bonding rod length should be used, thereby making it impossible to build a unique and accurate model.

In the Bruce model, the atoms are made identical by using the van der Waals radius per every element without considering the valence state. This idea may seem superior to the Hinomoto model, however, it can only express the accuracy with respect to extremely limited pairs of atoms. Further, the only difference in the Bruce model is that the bonding rod length in the Hinomoto model is replaced by the total length of the spheres and rod, thus, the actual problem has yet to be solved. As a result, similar to the Hinomoto model, the Bruce model cannot uniquely and accurately express various pairs of atoms.

Further, since there is a basic need to simplify the concept of the molecular structure model, there appears motivation of trying to converge any carbon state into one numeric value by not only model producers but also specialized chemists in this field as well. Since the bonding distances vary between various pairs of atoms actually exist, the reason why a consistent and applicable model has not yet existed is mainly because of the problems noted in (1). For example, carbon C can comprise eight different types when the valence state is taken into consideration, where four of them shown in FIG. 1(a) which generally exist. Also, the abbreviated reference symbol and formal reference notations of the types of bond used in the present specifications and drawings are shown in FIG. 1(b).

In each of such different types, the individual electron orbital state differs, thus, the expressed sizes should differ as well. The conventional idea was that such differences can be negligible, however, it will limit the accuracy, and therefore, cannot build a consistent and universal model.

(2) The next problem is the lack of consideration on the types of bond, namely, the failure to express the lengths of the single bond, double bond, and triple bond separately. According to the theory of molecular orbit, the single bond is distinguished by having a δ bond, the double bond is distinguished by having a δ bond and a π bond overlapping with each other, and the triple bond is distinguished by having a δ bond and two π bonds overlapping with each other. Although various pairs of atoms exist, a detailed study as to whether such bond lengths share any commonality or not has never been conducted as of today. At most, the study probably goes as far as finding out that the bonding distance between a pair of identical atoms become longer in the order of triple bond, double bond, and single bond. As for the numeric values regarding the bond length, the covalent bond radiuses of the single bond, double bond, and triple bond are respectively determined.

With respect to the conventional models, the Hinomoto model makes distinction regarding the forms, however, it does not mention anything about the length of the bonding rod. In the Bruce model, neither form nor length is taken into consideration. The covalent bond radiuses based on the types of bond by Pauling was thought to have a far superior application value, however, in the valence state such as (=C<), for example, the carbon atoms cannot be expressed as spheres. Further, their numeric values are insufficient in expressing the accuracy of the bonding distance between the pairs of atoms in various valence states. Therefore, the two problems noted above are said to be the main cause of why a simple, general, unique, and accurate molecular structure models have not yet existed.

SUMMARY OF THE INVENTION

Therefore, in view of the problems in the conventional models, it is an object of the present invention to provide a molecular model that can express the structure of molecule in which the distance between the spherical bodies representing the atoms is determined based on molecular structure analysis data.

It is another object of the present invention to provide a molecular model that can express the distance between the spherical bodies representing the atoms as a total length of the radiuses of two spherical bodies and one bonding rod connecting the two spherical bodies.

It is a further object of the present invention to provide a molecular model that can accurately visualize the molecular structure with versatility by differentiating the radiuses of the spherical bodies in a valence state rather than an element itself.

It is a further object of the present invention to provide a molecular model that can accurately visualize the molecular structure with versatility by applying different radial lengths even within the same element and employing the bonding rod length between the two spherical bodies differentiated by the bonding state between the atoms.

In order to achieve the above objects, the structure of the molecular models representing the molecular structure in accordance with the present invention is constituted as described below.

Namely, in the first aspect of the present invention, a distance between the atoms obtained by molecular structure analysis data is expressed as a total length of the dimensional value derived from the radiuses of two spherical bodies representing the atoms and one bonding rod length representing the inter-atomic bond. The spherical bodies are broken down into types of atoms based on the valence state and provided with dimensional values based on the valence state, and the bonding rods are broken down into types of bonding rods based on the bond order between the atoms and provided with dimensional values based on the bond order. The dimensional values of the spherical bodies and bonding rod are visualized by multiplying the dimensional values by the same coefficient, respectively.

In the present invention, the distance between a pair of atoms in the molecular structure obtained by the molecular structure analysis data is understood as the total length of the radiuses of two spherical bodies and one bonding rod. Here, the atoms not only breaks down per every element, but also breaks down based on the valence state even if they are from the same element, and each of the atoms is provided with a dimensional value.

Further, the bonding rod does not change its length based on the atoms, but rather strictly breaks down into three types of bond, where they are the single bond of bond order 1, double bond of bond order 2, and triple bond of bond order 3. Further, the bond order is also expressed as a conjugated bond or a resonance hybrid such as 1.5 bond and 2.5 bond. This is based on the fact that the bonding distance per every type of bond does not change as much comparing with the radius of the atoms. Thus, even if the types of atoms change, if the bonding rod lengths reflecting only the types of bond is given, it is not necessary to much consider the difference between the types of atoms. The dimensional values obtained in such a way are multiplied by the common coefficient. For example, if 1 Å is visualized as 1 cm, such spherical bodies and connecting rods can be used to assemble a molecular model, as well as be used in CG (computer graphics).

In the second aspect of the present invention, the dimensional value of the single bond rod, where the bond order is 1 as defined in the first aspect of the invention, is characterized as a bonding distance of the hydrogen molecule. Here, the rod length of the single bond, which is a standard rod length, can be any numeric value within the range of the bonding distance. The hydrogen atoms are abbreviated often in molecular models, and considering the actual molecular models, the numeric value of the bonding rod length corresponding to the bonding distance of the hydrogen atoms is set to 0.7 Å, which is also preferable in view of the radiuses of other atoms.

In the third aspect of the present invention, the relationship between the bonding rod length $L_n$ and the bond order n for the bond order n=1–3, when the single bond rod length $L_1$=0.7 Å, which is in the bond order n=1 defined in the second aspect above, is expressed by the following equation:

$$L_n = L_1 + 0.01(n-1)(2n-15)$$

When the single bond length is $L_1$=0.7 Å, by using the equation above as an approximation, the conjugated bond (when bond order n is 1.5 or 2.5) with only a few extracted sample numbers from the molecular structure data and the determination and evaluation of the bonding distance of the resonance hybrid can be applied.

In the fourth aspect of the present invention, the dimensional value when there are several types of identical atoms or bond types in the first to third aspects of the present invention noted above, the dimensional value is characterized as either a weighted mean value, an arithmetic mean value, a median, or a mode.

In the molecular structure analysis data, even if the molecular structure is locally comprised of a pair of identical atoms, the numeric value may differ if the molecular structure is different on an overall basis (in a case where β atoms and atoms thereafter are different even if adjacent α atoms are the same). In such a case, a number of original data are considered and a representing value obtained from the weighted mean value, arithmetic mean value, median, or mode is applied to determine a combination that is well match the measured value in the molecular structure analysis data as a whole.

BRIEF DESCRIPTION OF THE INVENTION

FIG. 3 is a data table showing an example of data on the radiuses of the spherical atoms and the spherical rod dimensions of the bonding rod length in the new model.

FIG. 4 is a data table showing an example of relationship between the single bond rod length and the dimensional values (size) of the spherical atoms radius and bonding rod length.

FIG. 6 is a data table showing an example of comparison data between the new model and the measured mean values regarding the distance between the atoms that are single bonded to one another.

FIG. 7 is a data table showing another example of comparison data between the new model and the measured mean values regarding the distance between the atoms that are single bonded to one another.

FIG. 8 is a data table showing a further example of comparison data between the new model and the measured mean values regarding the distance between the atoms that are single bonded to one another.

FIG. 9 is a data table showing a further example of comparison data between the new model and the measured mean values regarding the distance between the atoms that are single bonded to one another.

FIG. 10 is a data table showing an example of comparison data between the new model and the measured average value regarding the distance between the atoms that are double bonded to one another.

FIG. 11 is a data table showing another example of comparison data between the new model and the measured average value regarding the distance between the atoms that are double bonded to one another.

FIG. 12 is a data table showing an example of comparison data between the new model and the measured average value regarding the distance between the atoms that are triple bonded to one another.

FIG. 13 is a data table showing an example of measured data regarding the bonding distance associated with sulfur s11 atoms.

FIG. 14 is a data table showing an example of measured data regarding the bonding distance associated with hydrogen h10 atoms.

FIG. 15 is a data table showing an example of relationship between the bond order n, bonding rod length Ln, and the constant number An.

FIG. 16 is a data table showing an example of comparison data between the covalent bond radius based on the new model and the covalent bond radius based on the conventional model (Pauling).

FIG. 17 is a diagram showing a graphical view of the comparison data of FIG. 16 regarding the covalent bond radius between the new model and Pauling.

FIG. 18 is a data table showing comparison data regarding the radius among the new model, Pauling and Bondi with respect to the van der Waals radius.

FIG. 20 is a data table showing an example of data regarding the ion radius determined by the measured value based on Shannon and Prewitt.

FIG. 22 is a data table showing an example of comparison data between the hydrogen bond distance representation based on the new molecular model and the hydrogen bond radius based on the measured value.

FIGS. 24($a$) and 24($b$) are diagrams showing the relationship between various radiuses and the bonding model.

Figure 25:
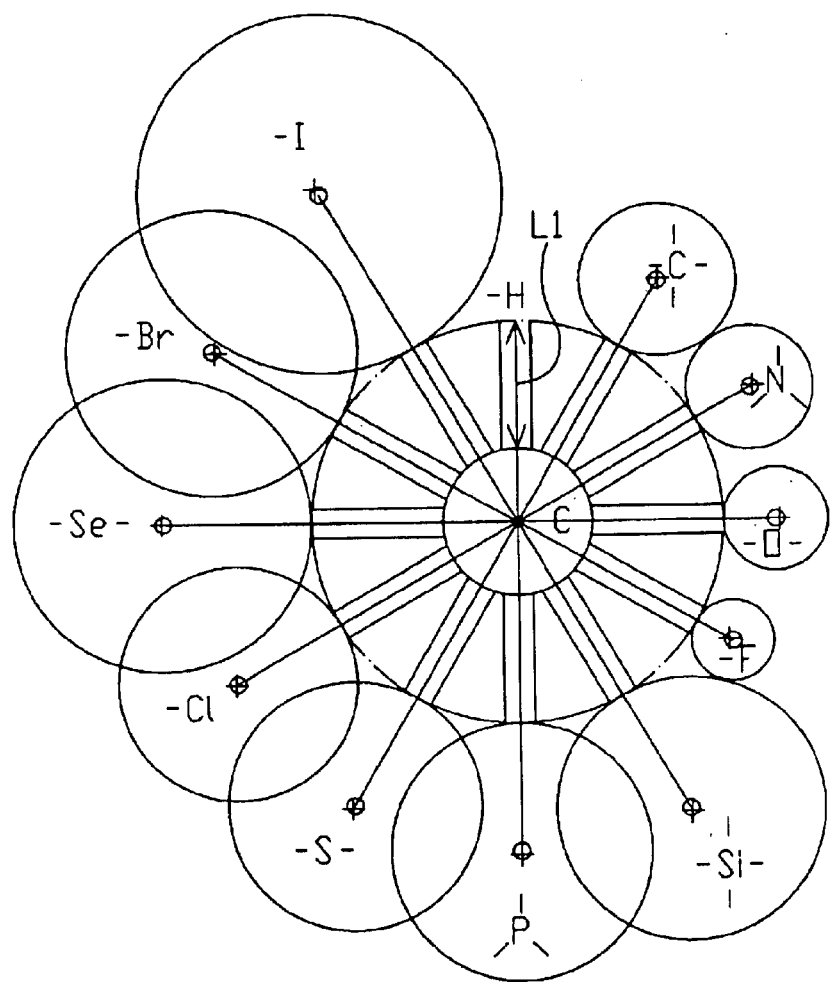

FIG. 25 is a diagram showing the bonding relationship representation between the atom type of —C— and other atom types in the new molecular model.

FIGS. 26($a$) and 26($b$) are diagrams showing differences between the new molecular model and the conventional molecular model in the case of fluorine and iodine molecules.

DETAILED DESCRIPTION OF THE INVENTION

The present invention will be described in more detail with reference to the accompanying drawings. A molecular model represents a structure of a molecule for use in chemical study, etc. The molecular model of the present invention is designed to express the distance between atoms obtained by molecular structure analysis data as a total length of two spherical bodies representing the atoms and one bonding rod representing the bond between the atoms. It should be noted that although the following descriptions involve sizes and shapes of actual molecular, the molecular model of the present invention will be implemented by a plastic model, wood model, or a computer graphic model of visual sizes by proportionally enlarging the sizes and shapes described in the molecular level.

The molecular model of the present invention provides a general solution with versatility by (a) differentiating the radiuses of the spherical bodies based on the valence state of the atoms rather than an element unit, and applying different radial lengths even within the same element, and (b) applying the bonding rod lengths differentiated by the bonding state between the atoms. It is important to note that the solution in the present invention is obtained from the existing molecular structure data, rather than from using the numeric values of the existing van der Waals radius or the covalent bond radius.

For doing this, there is a need to statistically determine the radiuses of the spherical bodies and the bonding rod lengths based on the above concepts (a) and (b) which match the measured values of the bonding distance of many existing molecular structures. It is important to determine the radiuses of the spherical bodies and the bonding rod length as a set, while adjusting the combination of the numeric values obtained at the end to consistently match the measured values.

In order to obtain such combinations of numeric values, at least one numeric value of any component must be tentatively determined. The most convenient one is the bonding rod length representing a single bond of atoms, which is commonly used. Once this is determined, the remaining numeric values will automatically be reached. As a result, the basis of the production method of the molecular model of the present invention is in the concepts of (a) and (b), as well as the appropriate determination of the radial spheres or bonding rod lengths. The feature of this method is to revise a molecular model with an improved accuracy with the data of measured values of the newly found molecular structures by statistical calculation and fine adjustment.

Concept of New Molecular Model

The parameters required for expressing the distance between the atoms are obviously the radius of the first spherical body representing the first atom, the radius of the second spherical body representing the second atom, and the bonding rod representing the bond between the two atoms. Next, when examining how to change those parameters to express an accurate distance between the atoms, the following three methods are possible:

(a) Maintain the radiuses of all of the spherical bodies constant, and change the lengths of the bonding rods (Hinomoto molecular model).

(b) Change both the radiuses of the spherical bodies and the lengths of the bonding rods (Bruce molecular model).

(c) Change the radiuses of the spherical bodies based on the valence state of each element, and change the lengths of the bonding rods between the spherical bodies based on the bonding state (new molecular model).

When examining which type to use for building an accurate molecular model with versatility, the method (b) may be considered the most limited model with less versatility, however, in reality, the method (a) is the same as the method (b). Since the total length of the spherical bodies and bonding rod will change depending on the types of bonds even if the radius is the same for all of the spherical bodies, the method (a) is considered a special form of the method (b). Thus, both the method (a) and method (b) are unsuitable for the object of the present invention for achieving the high accuracy, consistency, and versatility.

Figures 1A, 1B:
FIG. 1($a$) is a diagram explaining an example of valence state of carbon C, and FIG. 1($b$) is a diagram showing examples of abbreviated symbols expressing the types of bond.
Figure 2:
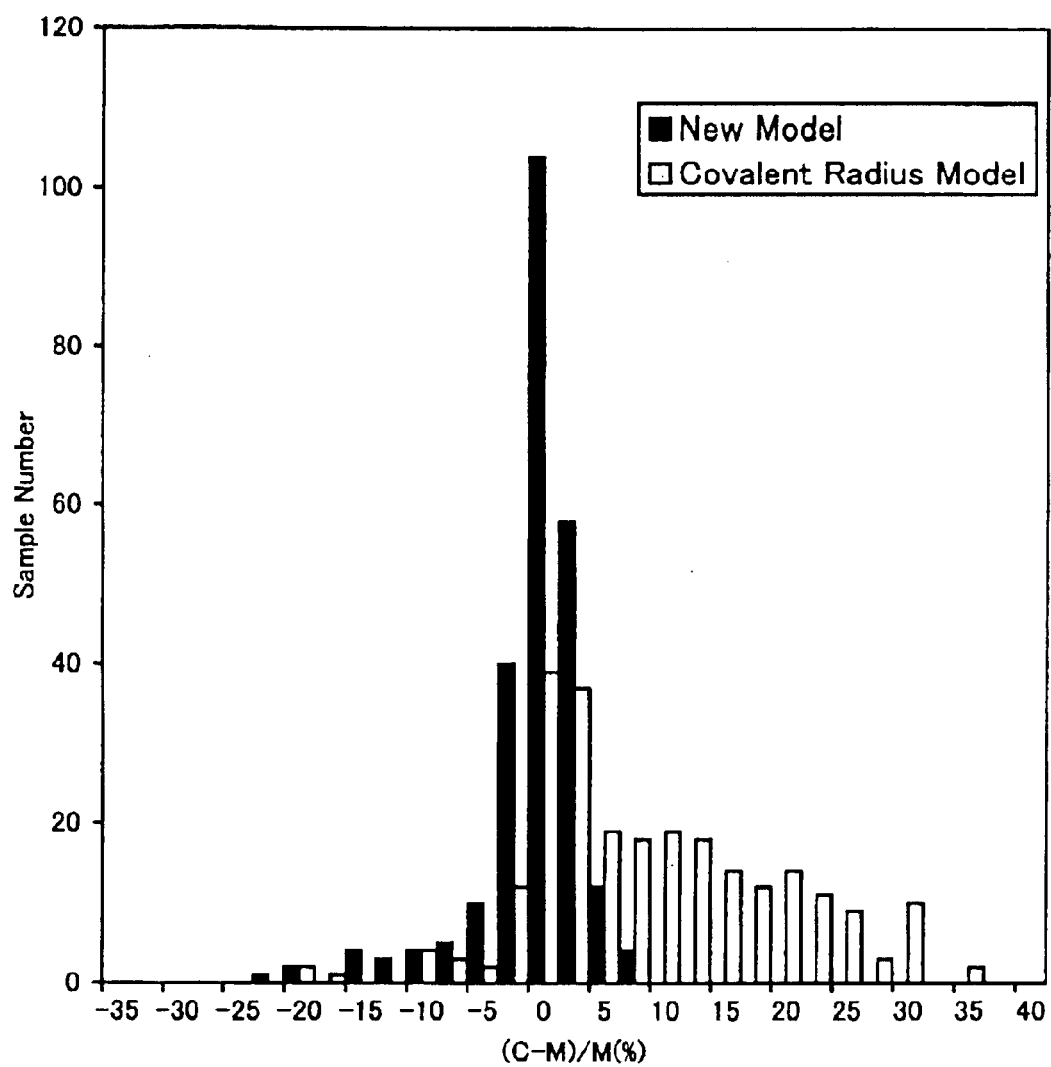
FIG. 2 is a diagram showing the differences in the atom distance between the molecular model of the present invention and the measured values and between the conventional model and the measured values.

Therefore, the new molecular model in the present invention uses the method (C), however, how to determine the radiuses of the spherical atoms is an issue. Naturally, the covalent bond radius seems applicable, yet, the radiuses in this approach do not sufficiently match the measured values (molecular structure analysis data) as shown in FIG. 2 where C represents the calculated values and M represents the measured values. Due to this fact, the present invention employs a completely new approach, i.e., (a) the radiuses of the spherical bodies representing the atoms are determined based on the valence states and (b) the lengths of the bonding rods representing the inter-atomic bonds are determined based on the bond types.

What is emphasized here is that the known approach such as using the numeric values of the van der Waals radius or the covalent bond radius is not used in the present invention. In other words, new solutions will be statistically determined from the existing molecular structure data. The availability of this new molecular model will be demonstrated by examining how much the new molecular model can accurately express the distance between the atoms of the actual molecules.

The details of the determination process of the radiuses of spherical bodies in the present invention are described below.

(1) First, bonding distance data is collected and organized per every pair of atoms in consideration of the valance state from the existing molecular structure analysis data. All the bonds are then broken down into various pairs of atoms, which theoretically reaches as many as 2,850 types of atomic pairs. The actual molecular structure data used for establishing the present model is based, for example, on the information in the reference "Chemical Handbook, Fundamental Volume, $2^{nd}$ Revision, $4^{th}$ Edition" (Japanese Institute of Chemists, Maruzen).

In the data obtained in this manner corresponding to approximately 650 types of molecular structure, the number of types of single bond is 180, the number of types of double bond is 59, and the number of types of triple bond is 10. Further, as a result of investigating the covalent bond of non-metallic elements, the number of types of atoms in consideration of the valance state is 75. The available molecular structure data is not limited to the above reference.

(2) Then, the radiuses of the spherical bodies and the lengths of the bonding rods are determined. As described above, as a first step, it is preferable to determine the single bond rod length which is most commonly used. Here, the single bond length, which is the standard rod length, can obtain any numeric value within the range of the bonding distance. In the molecular models, hydrogen atoms are usually abbreviated, and further in the situation where the actual molecular structure model is taken into consideration as well, the single bond rod length representing the length 0.7 Å, which is a numeric value corresponds to the bonding distance between the hydrogen molecules, is preferable in addition to the reasons explained later.

(3) Lastly, the radiuses of the spherical bodies based on the valence state of the atoms and the bonding rod lengths based on the bonding state of the atoms are determined. After determining the bonding rod length of the single bond, a radius of the spherical body for the atom type —C— is determined by the measured value of —C—C—, for example. Next, a radius of spherical body for the atom type =C— is determined based on the measured value of =C—C—. As a consequence, a bonding rod length of a double bond can be obtained from the measured value of —C=C—. Such procedures are repeated to determine the combinations of the overall numeric values.

However, in these numeric values, in a case where an overall molecular structure is different even though they are locally the same pair of atoms (ex., when α atoms are the same but β atoms and atoms thereafter are different), the numeric values will naturally differ as well. In such a case, it is necessary to determine the combinations that are well match the measured values by applying the representing values obtained from the weighted mean value, arithmetic mean value, median, or mode, while considering the number of original data. This procedure is repeated for recalculating the entire structure of the molecular model.

To simplify the new molecular model as well as easily assemble the components of the molecular model by a unique process, it is necessary to assign a fixed bonding rod length to the single bond, double bond, and triple bond, respectively. As explained above, in the present molecular model, the single bond rod length is determined first, then spherical body radiuses are determined. If there arises an inconsistency in the process of calculating the radiuses of those various atom types, the numeric values have to be modified so that the resultant numerical values as a whole match the measured values. Moreover, the bonding rod lengths representing the double bond and the triple bond reached by the foregoing assumption also need to be checked as to whether the constant values thus obtained well match and balance as a whole. The spherical and rod dimensions of the spherical body radiuses and the bonding rod lengths in the new molecular model determined through the foregoing process are shown in the table of FIG. 3.

Bonding Rod Length Based on Bond State

Figure 5:
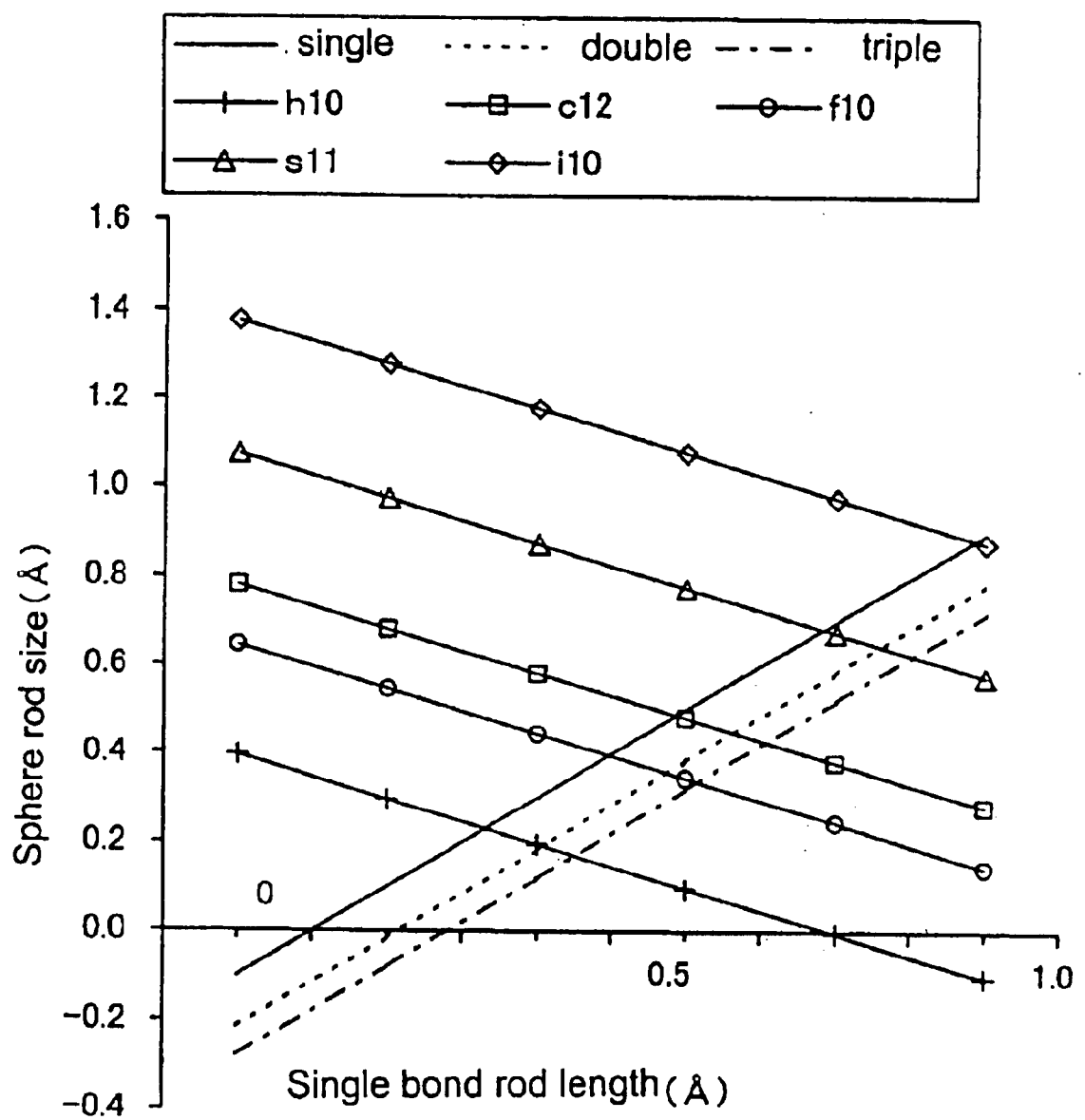
FIG. 5 is a diagram showing the relationship between the single bond rod length and the dimensional values (size) of the spherical atoms radius and bonding rod length.

In the new molecular model of the present invention, since the bonding distance between the atoms is represented so that once the dimension of one component is determined as a standard, dimensions of other components will be determined accordingly. FIGS. 4 and 5 show the relationship between the single bond rod length and the dimensional values (size) of the spherical body radiuses and bonding rod lengths. Since there are two atoms per one bonding rod, the radiuses of the spherical bodies representing the atoms are tilted by $-\frac{1}{2}$ relative to the single bond rod length. The rod lengths representing the double bond and triple bond are shorter than the single bond rod length, thus, differ only at the tip portions. When building the actual molecular model, since the dimensions of the spherical bodies and bonding rods cannot be expressed as negative values, the possible range of the single bond rod length is from 0.18 Å where the triple bond in FIG. 5 becomes positive to 0.7 Å, where hydrogen h10 in FIG. 5 becomes positive.

Here, when the standard rod length of the single bond is 0.7 Å (minimum value where the spherical body radius is not negative), and the standard spherical atom radius of atom i is $R_{is}$, a radius $R_i$ of the atom i in the valence state is expressed below as a function of single bond rod length $L_1$:

$$R_i = R_{is} + (0.7 - L_1)/2$$

Radius of Atom Based on Valence State (1)

The determination process of spherical radius R(c12) of atom c12 in the data table of FIG. 3 will be explained below with respect to the single bond rod length $L_1=0.7$ Å. FIGS. 6–9 show the comparison data between the new molecular model and the measured mean values regarding the distance between the atoms that are single bonded to one another. FIGS. 10 and 11 show the comparison data between the new molecular model and the measured average value regarding the distance between the atoms that are double bonded to one another. FIG. 12 show the comparison data between the new molecular model and the measured average value regarding the distance between the atoms that are triple bonded to one another. The process of determining the radius of a type of atoms based on the valance states is conducted as described below.

(1) First, extract the bond distance $D_i$ related to the type of atoms having both the single bond and the double bond associated with C and N from FIGS. 6–9 showing the single bond distances and from FIGS. 10 and 11 showing the double bond distances.

(2) Then, calculate the spherical radius R(c12) of the atom c12 by averaging all the numeric values of the single bond distances including the atoms c12 and other bonding distances between C and other than C.

For example, from FIG. 7, since the bonding distance is $D_{60}=1.455$ for a type of atom c12c12 of serial No. 1-60 and the extracted sample number is n=47, the spherical radius R(c12) of the atom in a symmetrical bond can be expressed as follows:

$$R(c12) = (D_{60} - L_1)/2 = (1.455 - 0.7)/2 = 0.378 \text{ (Å)}$$

Similarly, from FIG. 7, since the bond distance is $D_{61}=1.512$ for a type of atom c12c13 of serial No. 1-61 and the extracted sample number is n=59, the spherical radius R(c12) of the atom in a symmetrical bond can be expressed as follow by using the radius R(c13)=0.415 for the atom c13 in FIG. 3:

$$R(c12) = D_{61} - L_1 - R(c13) = 1.512 - 0.7 - 0.415 = 0.397 \text{ (Å)}$$

Thus, by sequentially obtaining the radiuses R(c12), the spherical radius of bond type c12 (FIG. 3) is determined by calculating the weighted mean value as follows:

$$R(c12) = \Sigma(R(c12)_i \times n_i)/\Sigma n_i = 0.380 \text{ (Å)}$$

Through a similar process, the radius of bond type n12 (FIG. 3) is determined as R(n12)=0.344 (Å).

(3) In the last step, confirm the atomic radiuses determined in the foregoing process as to whether there is any inconsistency for various bonding distances between various atoms.

Radius of Atom Based on Valence State (2)

The determination method of the atomic spherical radius with respect to sulfur s11 and hydrogen atom h10 in FIG. 3 will be explained below using the single bond rod length $L_1=0.7$ Å.

(1) First, extract the bonding distance data including the sulfur s11 from tables in FIGS. 6–9 and denote them as bond distances $D_{si}$ (FIG. 13).

(2) In the case of symmetrical atoms, the type of atom s11s11 of serial No. 1-165, for example, has a distance $D_{s165}=2.015$. Thus, calculate the radius R(s11) of sulfur by subtracting the standard single bond rod length 0.7 Å from the distance $D_{s165}$ and dividing the result by 2 as follows:

$$R(s11) = (D_{s165} - L_1)/2 = (2.015 - 0.7)/2 = 0.658 \text{ (Å)}$$

(3) In the case of asymmetrical atoms, the type of atoms c13s11 of serial No. 1-85, for example, has a distance $D_{s85}=1.820$. Thus, calculate the radius R(s11) of sulfur by subtracting the standard single bond rod length 0.7 Å and the atomic radius R(c13)=0.415 Å in FIG. 3 from the distance $D_{s85}$ as follows:

$$R(s11) = D_{s85} - L_1 - R(c13) = 1.820 - 0.7 - 0.415 = 0.705 \text{ (Å)}$$

(4) Determine atomic radiuses R(s11) for all of the average distances $D_{si}$ through the foregoing steps and produce a weighted mean value of them as a final value as follows:

$$R(s11) = (\Sigma R(s11)_i \times n_i)/(\Sigma n_i) = 0.674 \text{ (Å)}$$

(5) Next, extract the bonding distance data including the hydrogen atom h10 from the tables in FIGS. 6–9 and denote them as bond distances $D_{hi}$ (FIG. 14). In the above example, the hydrogen atom radius R(h10) is assumed as 0 Å to calculate the radius of sulfur s11. Here, the mean value of the atomic radius of s11 is used to determine the atomic radius of hydrogen atom based on a distance $D_{h26}=1.336$ of a type of atom h10s11 in serial No. 1-26. Therefore, the radius R(h10) is calculated as follows:

$$R(h10)=D_{h26}-L_1-R(s11)=1.336-0.7-0.674=-0.038 \text{ (Å)}$$

When calculating atomic radiuses $R(h10)$ of $h10(H-)$ from many other bond types in a similar manner and determining the weighted mean value of them, the radius $R(h10)$ is calculated as follows:

$$R(h10)=(\Sigma R(h10)_i \times n_i)/(\Sigma n_i)=-0.004 \text{ (Å)}$$

In view of the above two equations, it is obvious that there is no problem in assuming the radius of the hydrogen atom as 0 Å. In this manner, all types of atoms are interrelated to one another, thus, the calculation of the atomic radius is repeated several times for all types of atoms when new data is available to determine well-fitted values applicable to all of the bonds and atoms rather than only specific bonds or atoms.

Bonding Rod Length of n-th Order

Further, in the new molecular model according to the present invention, the bonding rod length ($L_n$) of the n-th bond order, where the single bond is denoted as n=1, the double bond is denoted as n=2, and the triple bond is denoted as n=3, respectively, is expressed as $L_n=L_1+A_n$ (A is a constant number unique to an n-th order where $A_1=0$). By using such expressions, in the case of conjugated bond (i.e., bond order n=1.5 or n=2.5), where the π electron is delocalized, evaluation as to whether the rod lengths of other n-th order bonds and the rod lengths of the conjugated bonds have a consistency or not can be made easily. The process of determining $L_n$ and $A_n$ in the above expression will be explained below.

(1) First, extract the data indicating the double bond rod lengths from FIG. 10 showing the bond distance of the double bond including the type of atom c12 and average the data to obtain the double bond rod length associated with the single bond distance.

For example, the atom type c12c12 of serial No. 2-13 in FIG. 10, the bond distance is $D_{c13}=1.343$ and the extracted sample number is n=67, and similarly the atom type c12c12 of serial No. 2-15 has a distance $D_{15}=1.314$ and a sample number is n=29. From the table of FIG. 3 showing the radiuses of the spherical atoms, since the radiuses are R(c12)=0.380 and R(n12)=0.344, respectively, the bonding rod length $L_2$ for the atom type c12c12 is:

$$L_2=D_{13}-2R(c12)=1.343-2\times 0.380=0.583 \text{ (Å)}$$

Further, $L_2$ for the atom type c12n12 is:

$$L_2=D_{15}-R(c12)-R(n12)=1.314-0.380-0.344=0.590 \text{ (Å)}$$

Lastly, the bonding rod length $L_2$ of the double bond will be determined as a weighted mean value of the above values associated with the single bond distance.

$$L_2=\Sigma(L_{2i} \times n_i)/\Sigma n_i$$

$$L_2=(0.583\times 67+0.590\times 29)/(67+29)=0.585 \text{ (Å)}$$

Further, since $L_n=L_1+A_n$, when the single bond rod length $L_1=0.7$ (Å), the constant number $A_2$ is:

$$A_2=L_2-L_1=0.585-0.7=-0.115$$

By using the same process for other data in FIGS. 3 and 12, the following bonding rod length and constant number can be determined:

$$L_3=0.520 \text{ (Å)}$$

$$A_3=L_3-L_1=0.520-0.7=-0.180$$

(2) From the relationship among the obtained rod length $L_n$, constant number $A_n$ and the bond order n, the value of the constant number $A_n$ relative to n-th bonding can be well approximated by the following relationship of:

$$A_n=0.01(n-1)(2n-15)$$

Thus, the relationship between the rod length $L_n$ and the bond order n for n=1, 2 and 3 can be expressed as follows:

$$L_n=L_1+0.01(n-1)(2n-15)=0.7+0.01(n-1)(2n-15)$$

This equation is especially useful for determination and evaluation of the conjugated bonds distance (bond order n is 1.5 or 2.5) where there are less extraction samples from the molecular structure data. The relationship between the rod length $L_n$, and the constant number $A_n$ and the bond order n is shown in FIG. 15.

When the population of the molecular structure data is different or a different value is applied to the length $L_1$, or when a value other than the weighted mean value is used, the relationship between the rod length $L_n$ and the bond order n for n=1, 2 and 3 will be expressed by approximation different from the above.

Relationship Between New Model and Covalent Bond Radius

Covalent bond radiuses obtained by Pauling (L. Pauling; The Nature of the Chemical Bond, Third Edition, Cornell University Press, 1960) corresponds to a case of the new model where the bonding rod length is 0. The radius $R_{itcb}$ for covalent bond (or "cb") of an atom i in the new molecular model (Takamatsu or "t") using the above related equations matches well with the value where ½ times the n-th order bonding rod length $L_n$ is added to the standard spherical atom radius $R_{is}$ of the atom i.

$$R_{itcb(n)}=R_{is(n)}+0.5L_n=R_{is(n)}+0.5L_1+0.005(n-1)(2n-15)$$

Therefore, the covalent bond radius of a single bond is expressed as:

$$R_{itcb(1)}=R_{is(1)}+0.5L_1=R_{is(1)}+0.35$$

The covalent bond radius of a double bond is expressed as:

$$R_{itcb(2)}=R_{is(2)}+0.5L_1-0.055=R_{is(2)}+0.295$$

The covalent bond radius of a triple bond is expressed as:

$$R_{itcb(3)}=R_{is(3)}+0.5L_1-0.09=R_{is(3)}+0.26$$

FIGS. 16 and 17 show the data comparing between the covalent bond radius $R_{itcb(n)}$ based on the new model and the covalent bond radius $R_{ipcb(n)}$ based on Pauling (or "p"). The values by the new model is smaller than Pauling's values by 0.03 Å in average, however, the standard deviation is 0.05 Å, which matches well.

Relationship Between New Model and van der Waals Radius

According to Pauling, the van der Waals radius is an atomic radius where an attractive force and a repulsion force between the atoms in the van der Waals model are balanced with each other. Because of the weak bondage, the van der Waals radius has a value larger than the covalent bond radius of a single bond by about 0.75 Å and 0.8 Å. The van der Waals radius according to Pauling and Bondi (A. Bondi, J. Phys. Chem., 68, 441–451, 1964) is shown in the table of FIG. 18. The van der Waals radius 1.70 Å of carbon atom according to Bondi (or "b") is based on the measured value of thickness of benzene, however, Pauling does not apply that value as the van der Waals radius.

The value larger than the covalent bond radius of the new molecular model of the present invention by 0.85 Å is considered the van der Waals radius. Therefore, the van der Waals radius $R_{itvdw}$ of the atom i in the new molecular model and the covalent bond radius $R_{itcb(1)}$ of single bond in the present new model matches well with the following relationship:

$$R_{itvdw} = R_{itcb(1)} + 0.85 = R_{is} + 1.2$$

Figure 19:
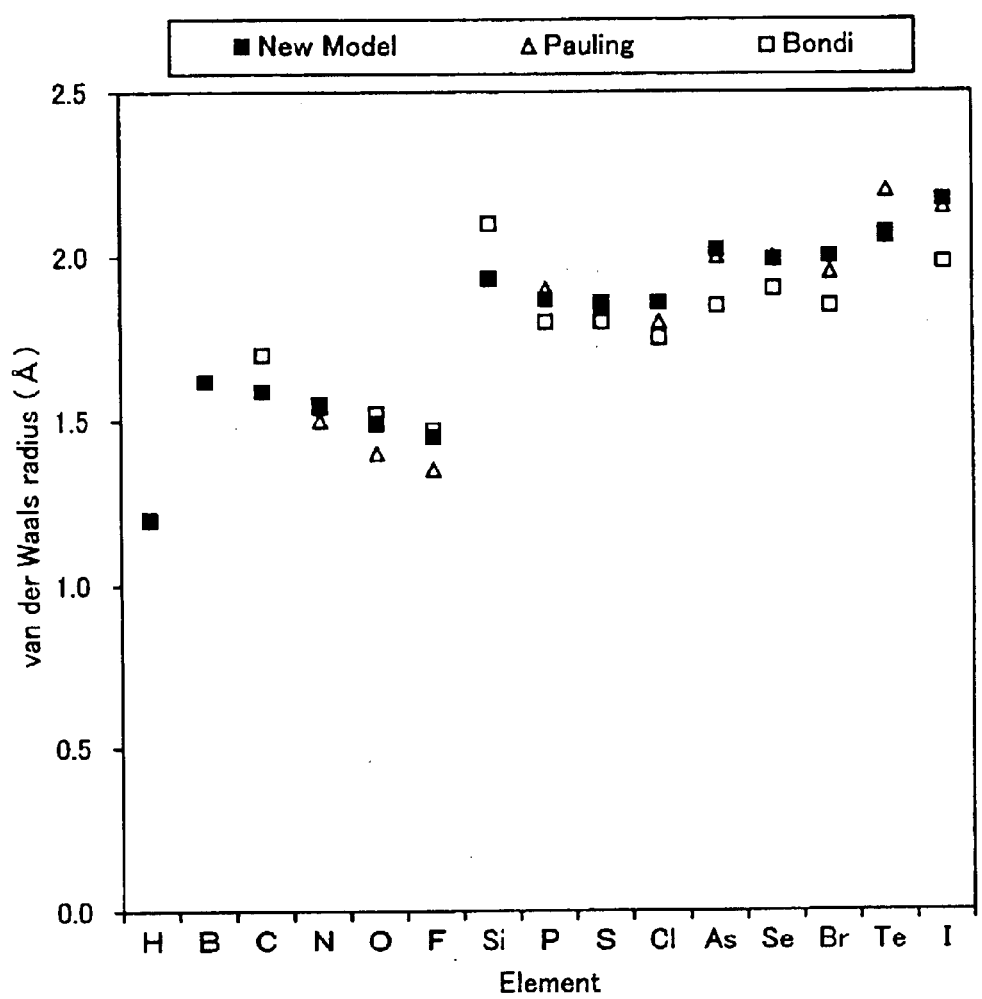
FIG. 19 is a diagram showing a graphical view of the comparison data of FIG. 18 regarding the radius among the new model, Pauling and Bondi with respect to the van der Waals radius.

Tables in FIGS. 18 and 19 show the data comparing among the radius of the new model ($R_{itvdw}$), Pauling ($R_{ipvdw}$) and Bondi ($R_{ibvdw}$) with respect to the van der Waals (or "vdw") radius concept. The tables show that the new model does not match well with the Bondi data for elements over Se but does match very well with Pauling's data.

New Model and Ion Radius

The non-metallic element studied in the present molecular model is extracted from the ion radius determined by the measured value based on Shannon and Prewitt (R. D. Shannon, C. T. Prewitt, Acta Crystallogr., B25, 925–946, 1969, R. D. Shannon, Acta Crystallogr., A32, 751–767, 1976) and shown in FIG. 20. In this table, the maximum value of each element is used for the negative ion radius, and the minimum value of each element is used for the positive ion radius. In the ion radius, a well-matched relationship can be fulfilled by using the standard radiuses of the spherical atoms and the single bond rod length of the molecular model of the present invention as shown below for the negative ion radius of atom i is $R_{it-1}$, $$R_{it-1} = R_{is(1)} + 1.5L_1 = R_{itcb(1)} + L_1$$

and for the positive ion radius of atom i is $R_{it+1}$, $$R_{it+1} = R_{is(1)} - 0.5L_1 = R_{itcb(1)} - L_1$$

Figure 21:
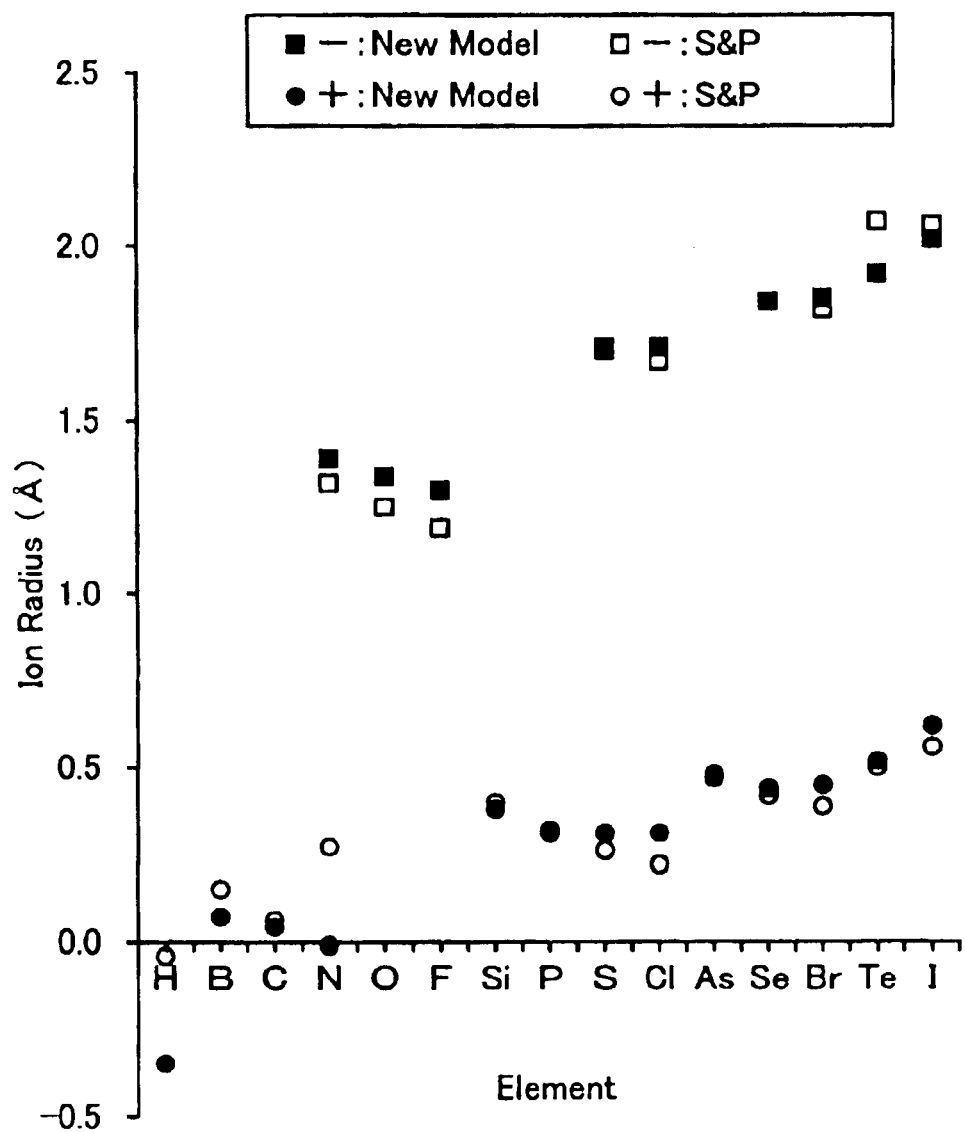
FIG. 21 is a diagram showing the comparison of the ion radius representation between the present molecular model and the conventional molecular model.

The comparison of the ion radius determined from the above relationship in the new molecular model and conventional molecular model is shown in FIG. 21. When comparing the calculated values of the molecular model of the present invention and the values based on Shannon/Prewitt in the conventional molecular model, the calculated values and the Shannon/Prewitt values in both the positive and negative ion radiuses match in most part. Hence, a good approximated value of the ion radius is obtained from the simple equation above.

Hydrogen Bond in New Model

The hydrogen bond was thought to be a semi-covalent bond, however, today it is viewed as a type of electrostatic interaction. The hydrogen bond radius has not been advocated in particular, yet, if defined in the same manner as other bond radiuses, the result of subtracting the radius of a spherical atom a and single bond rod length $L_1$ from the bond distance $D_{h(a-b)}$ of (atom a)–(hydrogen H) . . . (atom b) is calculated as the hydrogen bond radius. The hydrogen bond (or "hb") radius was thought to be closest to the negative ion radius, however, it is somewhat larger than that. In the new molecular model, the hydrogen bond radius $R_{bhb}$ of atom b bonded to a hydrogen atom matches well with the value adding 1.55 Å relative to the standard atom radius $R_{bs}$.

$$R_{bhb} = R_{bs} + 1.55$$

Further, the relationship between other radiuses when the standard single bond rod length of $L_1 = 0.7$ Å is expressed by the following relationship:

$$R_{bhb} = R_{bs} + L_1 + 0.85$$
$$= R_{bvdw} + 0.5L_1$$
$$= R_{bvdw} + 0.35$$
$$= R_{b-i} + 0.5L_1 + 0.15$$
$$= R_{b-i} + 0.5$$

Figure 23:
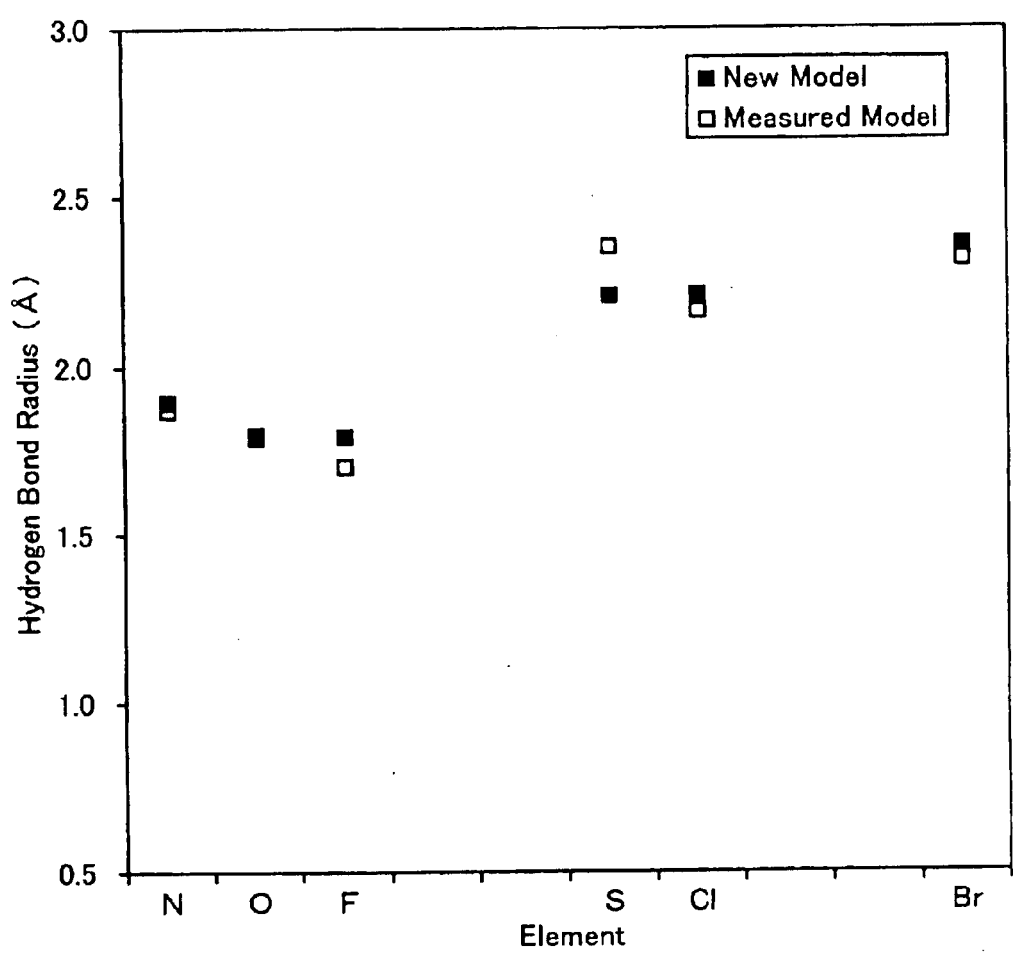
FIG. 23 is a diagram showing a graphical view of the comparison data of FIG. 22 regarding the hydrogen bond distance representation between the present molecular model and the measured values.

FIGS. 22 and 23 show comparison data between the hydrogen bond distance $R_{rhb}$ based on the new model and the hydrogen bond radius $R_{bhb}$ based on the measured value. The data of the hydrogen bond distance based on the measured value is derived from Pimentel (C. C. Pimentel, A. L. McClellan, "The Hydrogen Bond", Freeman, 1960) and Kuleshova (L. N. Kuleshova, P. M. Zorkii, Acta Crystallogr., B37, 1363–1366, 1981). Since the hydrogen bond is a weak bond, the bond distance varies, however, it can be expressed very well in the relationship of the new model.

New Model and Various Radiuses

Figure 24A:
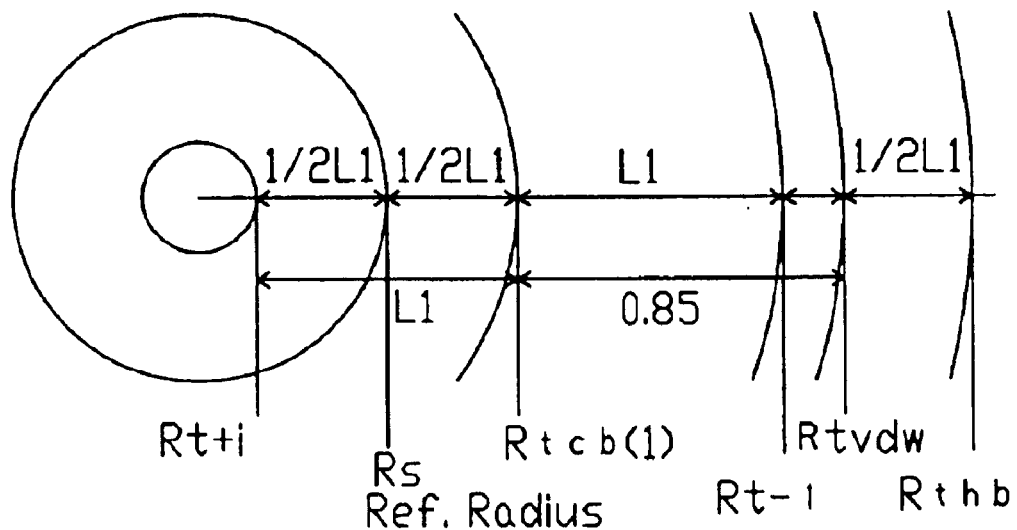
Figure 24B:
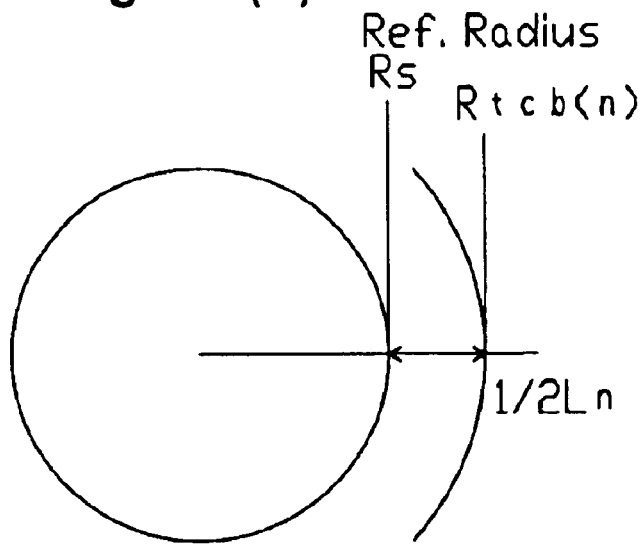

The object of the new molecular model of the present invention is to accurately express the molecular structures based on the molecular structure analysis data. The molecular model of the present invention is also capable of expressing the covalent bond, van der Waals radius, ion bond as well as hydrogen bond radiuses by the relationships described above. FIG. 24 shows the data of comparative relationship between the new molecular model and the atom related radiuses in the case of the single bond in FIG. 24(a) and in the case of n-th order bond in FIG. 24(b). In FIG. 24(a), the single bond rod length is $L_1 = 0.7$ Å. In the expression of these relationships, it is required only the standard spherical atom radius and the bonding rod length of the n-th order in the new molecular model with use of the single bond of about 0.7 Å.

Further, another important point is that the covalent bond radius and the single bond rod length in the present new molecular model can be expressed even if they are freely determined, however, the other radiuses such as the van der Waals radius and ion radius can consistently express the single bond rod length by the hydrogen molecule bond distance. This seemingly indicates that the electron cloud radiuses participating in the bond are about the same regardless of the element (in the case of covalent bond, ½ of the hydrogen molecule bond distance).

Therefore, the single bond rod length of the new molecular model can be freely selected from the range between 0.18 Å and 0.7 Å for expressing the covalent bond. However, in order to create the actual structure of molecular model, where it must be versatile enough to express other types of bond, it is most preferable to set the single bond rod length of the hydrogen molecule bond distance to a range between 0.6 Å and 0.7 Å.

In the molecular model of the present invention, the structures of the spherical bodies and bonding rods representing other well known molecular structure models can be employed. The new molecular model can correspond to various bonding angles without any stress. When assembling the actual molecular model of the present invention, it can be easily done without any ambiguity in the selection of sphere bodies and bonding rods by first selecting the spherical bodies with consideration of the element's valence state, and then selecting the bonding rods based on the types of bond. This process is repeated to establish the molecular model representing a desired molecular structure.

There is a molecular structure display software described by using the VRML (Virtual Reality Modeling Language), such as MOLDA (Hiroshi Yoshida, Physics & Chemistry Dept., Hiroshima University). However, this software uses the van der Waals radius for the radiuses of the spherical atoms. Instead, by using the relationship between the spherical/rod dimensions, covalent bond, van der Waals radius, and ion and hydrogen bond radiuses of the present invention, various bonding states can be easily displayed and visualized by a VRML viewer.

Implementation of the Invention

A specific example of the molecular model (new model) in accordance with the present invention will be explained below when the single bond rod length is 0.7 Å.

The table in FIG. 3 shows the bonding rod lengths and the radiuses of the spherical bodies representing atoms in the new molecular model. The measured value data of 650 molecular structures based on the "Chemical Handbook, Fundamental Volume II, $2^{nd}$ Revision, $4^{th}$ Edition" (Japanese Institute of Chemists, Maruzen), is used in the present embodiment. This data includes 180 types of single bonded atoms, 59 types of double bonded atoms, and 10 types of triple bonded atoms. Also, as a result of examining the covalent bond of the non-metallic element, there are 75 types of atoms considering the valence state.

FIG. 2 shows the differences in the atom distance between the new molecular model and the measured values and between the conventional molecular model and the measured values. The distance between the atoms in the new molecular model is determined by the radiuses of the spherical atoms and the bonding rod lengths of bond types shown in FIG. 3. The difference between the new molecular model and the calculated values of the conventional molecular model determined by the simple covalent bond is also shown. In the conventional molecular model based on the simple covalent bond radius, a difference of 8.8±10.2% in the measured value will arise. On the other hand, in the present new molecular model, the difference is −0.5±4.1%.

Further in FIG. 2, the rate of the atomic pairs where the difference is below 10% is about 96% in the new molecular model while about 61% in the conventional molecular model based on simple covalent bond radius. The rate of the atomic pairs where the difference is below 5% is about 91% in the new molecular model while about 44% in the conventional molecular model based on the simple covalent bond radius. Thus, in terms of accuracy, the new molecular model of the present invention has achieved the object by using the concept and process not known or used in any conventional molecular models.

FIG. 25 is a diagram showing an example of comparison between the new molecular model and the measured values derived from the molecular structure data with respect to the bond distance between the atom —C— and the other types of atoms. The single bond rod length is expressed as $L_1$=0.7 Å, however, when assembling the molecular model of the present invention, an accurate molecular model within the allowable deviation range can be built.

Figure 26A:
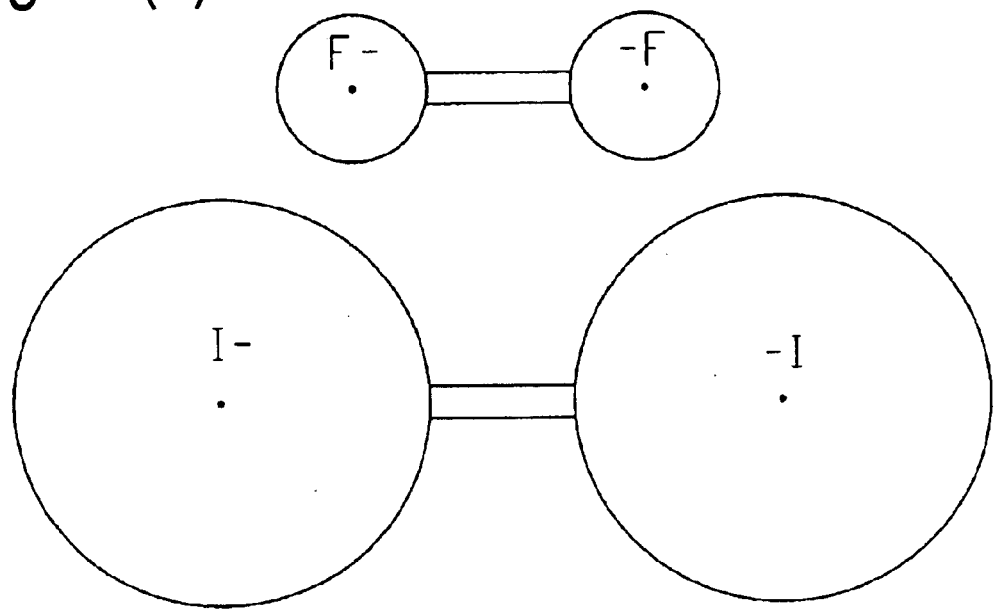
Figure 26B:
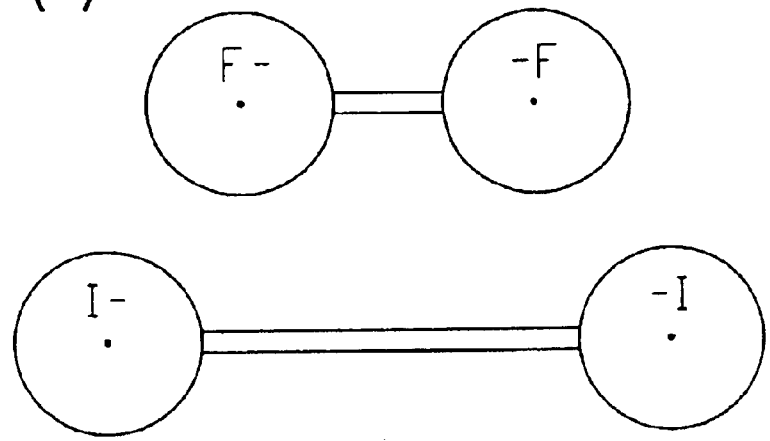

Further, since the difference in the radiuses of the spherical atoms express the electron clouds in a certain degree, the new molecular model can express the size of the molecule better than the conventional molecular model where the radiuses of all the spherical atoms are identical. FIG. 26 shows the fluorine and iodine molecules with respect to the new molecular model in FIG. 26(a) and the conventional molecular model in FIG. 26(b). Particularly, in the iodine molecule model, there is an obvious difference between the conventional molecular model and new molecular model. The new molecular model does not express the van der Waals radius showing the spread of the electron clouds, however, it can accurately visualize the size of the molecules than the conventional molecular model showing only the bonding distance.

As explained above, in the molecular model of the present invention, the distance between the atoms obtained by molecular structure analysis data is expressed by the sum of the radiuses of two spherical bodies representing the atoms and one bonding rod length representing the inter-atomic bond. Also, the molecular model of the present invention establishes a general solution with versatility by (a) differentiating the radiuses of the spherical bodies representing the atoms based on the valence state rather than an element unit, and applying different radial lengths even within the same element, and (b) applying the bonding rod lengths representing the inter-atomic bonds differentiated by the bonding state between the atoms. The solution in the present invention is determined based on the existing molecular structure analysis data, rather than the numeric values of the existing van der Waals radius or the covalent bond radius. Thus, the present invention can express an extremely faithful visualization of actual molecular structures.

Specifically, in the present invention, the single bond rod length is determined from the already known molecular structure data, and then the radius of the spherical body in considering the valence states led by the measured value is determined as the standard radius for each type of atom. Further, the bonding rod lengths of the double bond and triple bond are expressed by a simple quadratic function which can be easily applied to molecules comprising a conjugated structure. Moreover, based on the values of such sphere radiuses and rod lengths, the covalent bond radius, van der Waals radius, ion bond radius and hydrogen bond radius can be expressed by a linear function.

Therefore, when applying the relationship of sphere radiuses and bonding rod lengths of the present invention to MOLDA, which is a VRML molecular structure display software using a van der Waals radius as the spherical body radius, various bonding states can be easily visualized on a computer. In addition, changing from the spherical rod model to a space-filling model can be done easily. Further, since the hydrogen bond is significant in the biochemistry field, the present invention is highly useful in producing molecular model including such hydrogen bonds.

Moreover, when actually assembling the molecular model of the present invention, the spherical bodies are first selected considering element and the valence state, and then the bonding rod is selected based on the bond type. By repeating these steps to build a molecular model, the rod selection will be easily and consistently made without an error. The types of spherical body will be increased for expressing the various types of atoms, however, the simplification, where the differences are ignored during the expression of chemical diversity, is not desirable since it becomes difficult to grasp. In the present invention, since the radiuses of the spherical bodies are different from the varying elements in the valence state, and the bonding rod lengths are different from the varying bond conditions, assembly of the molecular model can be done easily without an error. Therefore, structures such as carbon nano-tubes and C60 can be appropriately reproduced, where the educational as well as industrial effects are remarkable.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A molecular model for accurately representing a molecular structure based on a distance between atoms of various types of bond in a molecular, comprising:

at least two spherical bodies representing atoms of the molecular structure where a radius of the spherical body is determined by a valence state derived from measurement values; and a bonding rod that connects the spherical bodies for representing an inter-atomic bond where a length $L_n$ of the bonding rod at a bond order n is determined by $L_n=L_1+A_n$, where $L_1$ represents a length of a bonding rod of single bond and $A_n$ represents a constant value at the bond order n;

wherein a bonding length of the atoms in the molecule are expressed by a total length of the radiuses of two spherical bodies and the length of one bonding rod, and wherein sizes of the spherical bodies and the bonding rod are obtained by multiplying with identical coefficients, thereby establishing a visual size of the molecular structure.

2. A molecular model as defined in claim 1, wherein a length $L_1$ of the bonding rod of single bond where the bond order is 1, is defined by a bonding distance of a hydrogen molecule.

3. A molecular model as defined in claim 1, wherein the relationship between the length $L_n$ at the bond order n of the bonding rod per every bond type and the bond order n is expressed by $L_n=L_1+0.01(n-1)(2n-15)$ when a length of the bonding rod of single bond at the bond order is 1 is $L_1=0.7$ Å.

4. A molecular model as defined in claim 1, wherein when a plurality of molecular structures having identical types of valence state or bond exist, the radius of the spherical body and the length of the bonding rod are defined by either a weighted mean value, arithmetic mean value, median, or mode.

5. A molecular model as defined in claim 2, wherein when a plurality of molecular structures having identical types of valence state or bond exist, the radius of the spherical body and the length of the bonding rod are defined by either a weighted mean value, arithmetic mean value, median, or mode.

6. A molecular model as defined in claim 3, wherein when a plurality of molecular structures having identical types of valence state or bond exist, the radius of the spherical body and the length of the bonding rod are defined by either a weighted mean value, arithmetic mean value, median, or mode.

* * * * *